United States Patent [19]

Kraus

[11] E Patent Number: Re. 33,267

[45] Reissued Date of Patent: Jul. 17, 1990

[54] PATTERN-RECOGNIZING SELF-TUNING CONTROLLER

[75] Inventor: Thomas W. Kraus, Foxboro, Mass.

[73] Assignee: The Foxboro Company, Foxboro, Mass.

[21] Appl. No.: 226,245

[22] Filed: Jul. 21, 1988

Related U.S. Patent Documents

Reissue of:

[64] Patent No.: 4,602,326
Issued: Jul. 22, 1986
Appl. No.: 560,617
Filed: Dec. 12, 1983

[51] Int. Cl.[5] ..... G05B 13/02; G05B 13/00

[52] U.S. Cl. ..... 364/158; 364/148; 364/159; 364/163; 364/160; 318/561

[58] Field of Search ..... 364/158, 148, 159, 160, 364/161, 162, 163, 164, 180, 181, 183, 184, 557, 156, 157; 318/561; 371/27

[56] References Cited

U.S. PATENT DOCUMENTS

| | | | |
|---|---|---|---|
| 3,030,054 | 4/1962 | Lee et al. | 364/160 |
| 3,564,221 | 2/1971 | Wheeling | 364/158 |
| 3,798,426 | 3/1974 | Bristol, II | 364/158 |
| 4,169,283 | 9/1979 | Lewis | 364/159 |
| 4,214,300 | 7/1980 | Barlow et al. | 364/159 |
| 4,328,452 | 5/1982 | Ragen et al. | 318/561 |
| 4,349,868 | 9/1982 | Brown | 364/163 |
| 4,349,869 | 9/1982 | Prett et al. | 364/156 |
| 4,368,510 | 1/1983 | Anderson | 318/561 |
| 4,386,397 | 5/1983 | Seaki | 364/148 |
| 4,425,614 | 1/1984 | Barron et al. | 364/158 |
| 4,451,878 | 5/1984 | Shigemasa | 364/159 |
| 4,494,184 | 1/1985 | Crevel | 364/557 |
| 4,527,271 | 7/1985 | Hallee et al. | 364/184 |

OTHER PUBLICATIONS

Von F. Habel, "Ein Verfahren zur Bestimmung der Parameter von PI-, PD- and PID-Reglern", Regelungstechnik, vol. 28, 1980, pp. 119–205.

W. Oppelt, Kleines Handbuch Technischer Revelorgange, 1972, 5th edition, pp. 467–468.

Caruthers and Levenstein, Adaptive Control Systems, Proceedings of a Symposium held in Garden City, Long Island, N.Y., Oct. 1960, Pergammon Press, 1963, pp. 1–15.

Davies, System Identification for Self-Adaptive Control, John Wiley & Sons, Ltd., London, 1970, pp. 294–311.

Yamashita et al., Digital Process Control, First Edition, Corona Publishing Co., Ltd., Tokyo, 1969, pp. 136–143.

Bristol, The Design of Industrially Useful Adaptive Controllers, ISA, 1982, pp. 568–583.

Automatic Control Handbook, Sixth Edition, Corona Publishing Co., Ltd., Tokyo, 1968, pp. 464–469.

*Primary Examiner*—Allen MacDonald

*Attorney, Agent, or Firm*—Finnegan, Henderson, Farabow, Garrett & Dunner

[57] ABSTRACT

A pattern-recognizing, self-tuning controller is provided for controlling a process wherein measured characteristics including at least one peak of an error signal, derived from the differences occurring over time between the values of a process controlled variable and a desired set-point level for that variable, are used for identifying the behavior pattern of the error signal so that an operating parameter of the controller can be changed as required to minimize process recovery time whenever the process is subsequently disturbed or an abrupt change is made to the set-point level at some later time. The preferred embodiment of the device is in the form of a proportional-integral-derivative (PID) controller in which the PID coefficients are calculated in accordance with prescribed relationships that are based on damping, overshoot and time period characteristics of the error signal. Provisions are also made for including a user-specified noise threshold in order to reduce substantially the possibility of detecting a noise peak as a true peak of the error signal. A pre-adapt mode is also included, in which the controller automatically determines the initial values of the PID coefficients, the noise threshold, and the approximate time scale of the process, before on-line adaptive control of the process is given to the controller.

66 Claims, 20 Drawing Sheets

PATTERN-RECOGNIZING SELF-TUNING CONTROLLER

Matter enclosed in heavy brackets [ ] appears in the original patent but forms no part of this reissue specification; matter printed in italics indicates the additions made by reissue.

BACKGROUND OF THE INVENTION

1. Field

This invention relates generally to adaptive controllers for controlling a process and more particularly to a self-tuning controller of the pattern-recognizing type in which controller operating parameters are changed automatically as required in response to differences occurring between the actual and desired states of the process so that controller behavior substantially matches process dynamics.

2. Description of the Prior Art

In a typical control loop, a controller is coupled to a process and a process controlled variable such as temperature, flow, or level is measured and fed back as a signal to the controller which compares that signal to a desired value known as the set point. Various controller elements respond to the error signal to generate a control signal for regulating the process so that the process controlled variable is maintained at the desired value. As can be understood, it is advantageous to have controller behavior substantially match the dynamics of a process so that the entire control loop can be maintained at its optimum state especially after the process has been disturbed or an abrupt change has been made to the set point.

A pattern-recognizing self-tuning controller automatically adjusts controller operating parameters so that controller behavior is changed as needed to keep the control loop in its optimum state. It should be understood that pattern recognition is a known technique used for manually tuning the operating parameters of a controller. Typically, the control system operating in a steady-state mode is perturbed and the pattern of the response is observed. A human operator compares that pattern to a desired pattern and modifies the controller settings so that two patterns are substantially matched. Tuning can thus be time consuming and costly if many trial-and-error attempts occur before the requisite experience and/or knowledge of the process is gained for setting the controller operating parameters.

Moreover, since controller settings are for a particualar set and range of operating conditions, manual retuning will be needed to compensate for changes in the operating conditions which may be the result of occurrences such as set point revisions, process load disturbances, or age, wear and corrosion of control system equipment. Various attempts have been made with limited success to provide an adaptive controller which eliminates the need for but duplicates the manual tuning process used by a skilled human operator.

For many applications, the equations which describe the dynamic behavior of the control loop are very complex so that it is very difficult to determine analytically what operating parameters should be used for achieving the desired ideal pattern. As a result, analytical solutions are oftentimes based on simplifying assumptions that reduce the range of operating conditions or the number of process applications which can be controlled without human intervention.

In U.S. Pat. No. 3,798,426 issued to E. H. Bristol and assigned to the present assignee, a pattern-evaluating adaptive controller is disclosed which is capable of being tuned without a human operator. As described in the patent, when the process being controlled is recovering from an upset such as a local disturbance or a change in set point, the controller made according to the Bristol teaching examines the initial recovery behavior of the process controlled variable and calculates various evaluation time intervals. Deviations of the process controlled variable from its desired value are preferably integrated over each of the evaluation intervals and combined to produce an integrated error. Based on the size of the integrated error, the operating parameters of the controller are changed as needed for insuring optimal control action when the process is next upset.

However, the relationship between the initial recovery behavior and the size of the associated evaluation intervals does not always remain constant for all operating situations. Although the controller taught by Bristol is suitable for controlling a complicated non-linear process, there are limits to the number of situations that can be managed before a human operator is required to change the criteria used for determining the evaluation intervals.

Accordingly, there is a need for an improved adaptive controller which is suitable for a wide range of operating conditions and/or applications. Moreover, it is desirable to minimize or eliminate the services of a human operator especially in situations where that operator faces physical dangers.

SUMMARY OF THE INVENTION

The above-mentioned limitations of prior art control loops and controllers are overcome by the provision of a new and improved self-tuning controller which includes a detector for measuring at least two characteristics of the behavior of the process controlled variable which behavior results when the process is reacting to an upset in operating condition. Also included is an adapter connected to an output of the detector for responding to the two characteristics and for changing an operating parameter of the controller as required so that the response of the control loop will match a prescribed performance criterion when subsequent disturbances or changes are applied to the process.

In a preferred embodiment of applicant's invention, the controller is a proportional-integral-derivative (PID) type. When the controller is set into control operation, peaks of the error signal which exceed prescribed levels based on a noise band are detected and used for calculating overshoot and damping characteristics of the closed loop response of the control loop. Changes are made as needed to the PID coefficients in accordance with differences between the calculated and desired values for the overshoot and damping characteristics. A provision is also made for a pre-adapt mode wherein the controller evaluates the open loop response of the control loop and determines the initial values of the PID coefficients, a maximum wait time related to the approximate time period of the process, and a noise band.

The present invention is suitable for controlling a wide range of operating conditions and applications without intervention by the human operator. It also does not require a large amount of knowledge to be accumulated about the particular process to be controlled. Since the present invention evaluates the behavior of the process controlled variable each time the process is reacting to an upset condition, tuning is automatically made for the adverse effects of local disturbances, or age, wear and corrosion of control system equipment. Furthermore, applicant's invention evaluates control loop behavior by measuring actual performance characteristics of that behavior for comparisons with desired values for those characteristics. As a result, the previously-mentioned problems associated with prior art controllers which attempt to find analytical solutions to the complex equations describing the control loop behavior are avoided.

The above-described and other features of the present invention will be more fully understood from a reading of the ensuing description given with reference to the appended drawings.

BRIEF DESCRIPTION OF THE DRAWINGS

FIGS. 3A and 3B through 8A and 8B when combined show a flow chart which describes specific operations of the preferred embodiment of the present invention.

DETAILED DESCRIPTION OF THE PREFERRED EMBODIMENT

Figure 1A:
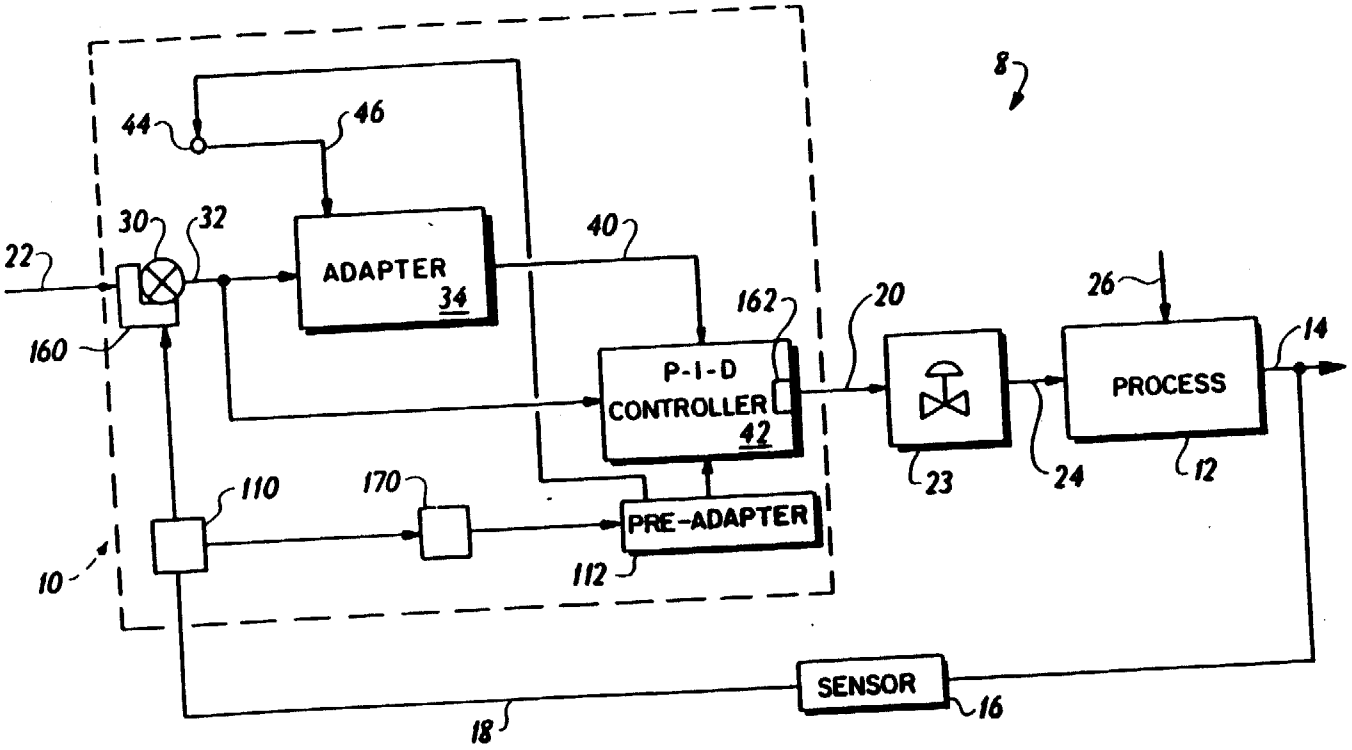
FIG. 1A is a block diagram of a control loop which includes a controller made in accordance with the present invention.

Depicted in FIG. 1A is a block diagram of a process control loop 8 which includes a self-tuning controller system 10 made in accordance with the teachings of the present invention and a process 12 that is characterized by a process controlled variable 14, such as but not limited to temperature, pressure, level or concentration. Coupled to receive the process controlled variable 14, sensor 16 operates to produce a measuring signal 18 which represents the value of the process controlled variable 14. The sensor 16 is connected to a switch 110 which for the present discussion is arranged for connection to an analog-to-digital (A/D) converter 160. A set point 22 applied to the D/A converter 160 represents the desired value for the process controlled variable 14. The self-tuning controller system 10 generates a control signal 20 in response to the digitally converted measuring signal 18 and set point 22. Operating to set the value of a controller manipulated variable 24, a final control element 23, such as a valve, receives the control signal 20 produced at the output of a conventional digital-to-analog (D/A) converter 162. The process 12 is responsive to changes in that variable to effect changes in the process controlled variable 14 so that its value is substantially equal to the desired value represented by set point 22.

It should be understood that the process 12 is also responsive to a disturbance 26. If the magnitude of disturbance 26 is sufficiently large to cause the process 12 to make appreciable changes in the value of the process controlled variable 14, the control loop 8 will respond accordingly with corrective action to remove the effects of the disturbance 26.

Being coupled to receive measuring signal 18 and set point 22, a comparator 30 operates to produce an error signal 32 which represents the difference between the value of the process controlled variable 14 and the desired value. An adapter 34 (to be described in greater detail hereinafter) is coupled to the comparator 30 for receiving the error signal 32. The adapter 34 then produces a processor signal 40 which is subsequently applied to an input of a conventional proportional-integral-derivative (PID) controller 42. Being also coupled to comparator 30 for receiving the error signal 32, the PID controller 42 operates to produce the controller signal 20 (representing corrective action) which is proportional to a three-term sum of the error signal 32 plus a time integral of the error signal plus a time derivative of the error signal. The relative contributions of each of the three terms are determined by constants that are known respectively as proportional (P), integral (I) and derivative (D) coefficients. The controller 42 responds to the processor signal 40 for setting the values for the PID coefficients. The adapter 34 includes an input terminal 44 for receiving an initializing signal 46 (to be described later in more detail) so that proper operation of the control loop 8 can commence when the self-tuning controller system 10 is first switched into operation.

Figure 1B:
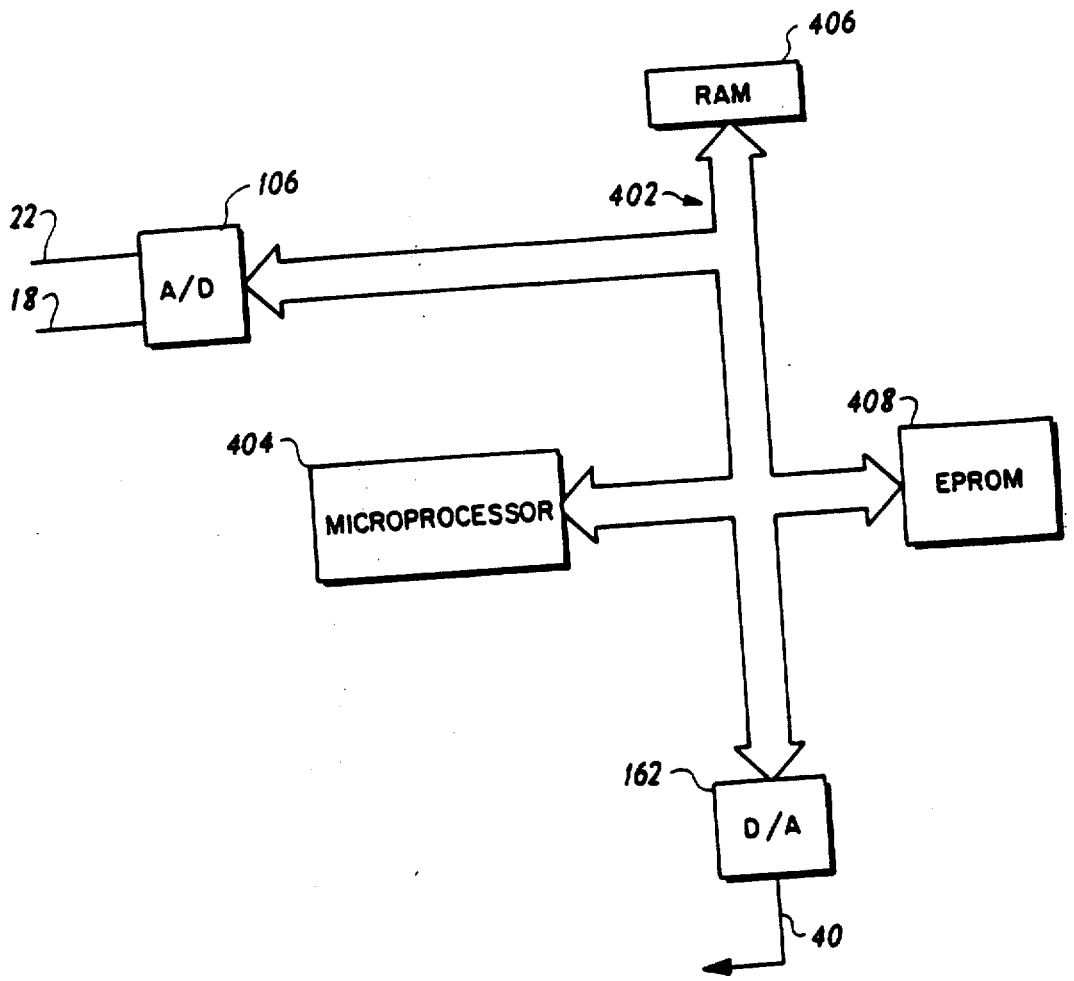
FIG. 1B is a block diagram depicting the electronic components of a preferred embodiment of the controller shown in FIG. 1A.

Depicted in FIG. 1B is a block diagram showing the electronic components of the adapter 34. The measuring signal 18 and the set point 22 are both applied to the input leads of the conventional analog-to-digital (A/D) converter 160 which produces digital signals representing the measuring signal 18 and the set point 22. These digital signals are transmitted along a bus 402 which has connections to an Intel 8051 microprocessor 404, a Random Access Memory (RAM) 406, an Electrically Programmable Read Only Memory (EPROM) 408, and the digital-to-analog (D/A) converter 162. It should be explained that the adapter 34 is actually embodied as a computer software program which is stored in EPROM 408 and which emulates the operations of actual hardware circuits. The RAM 406 contains the data memory and registers required by the microprocessor 404 for implementing the operations being controlled by the program in the EPROM 408. After the adapter 34 has processed the information derived from the measuring signal 18 and the set point 22, the resulting processor signal 40 is applied to the PID controller 42.

Figure 2:
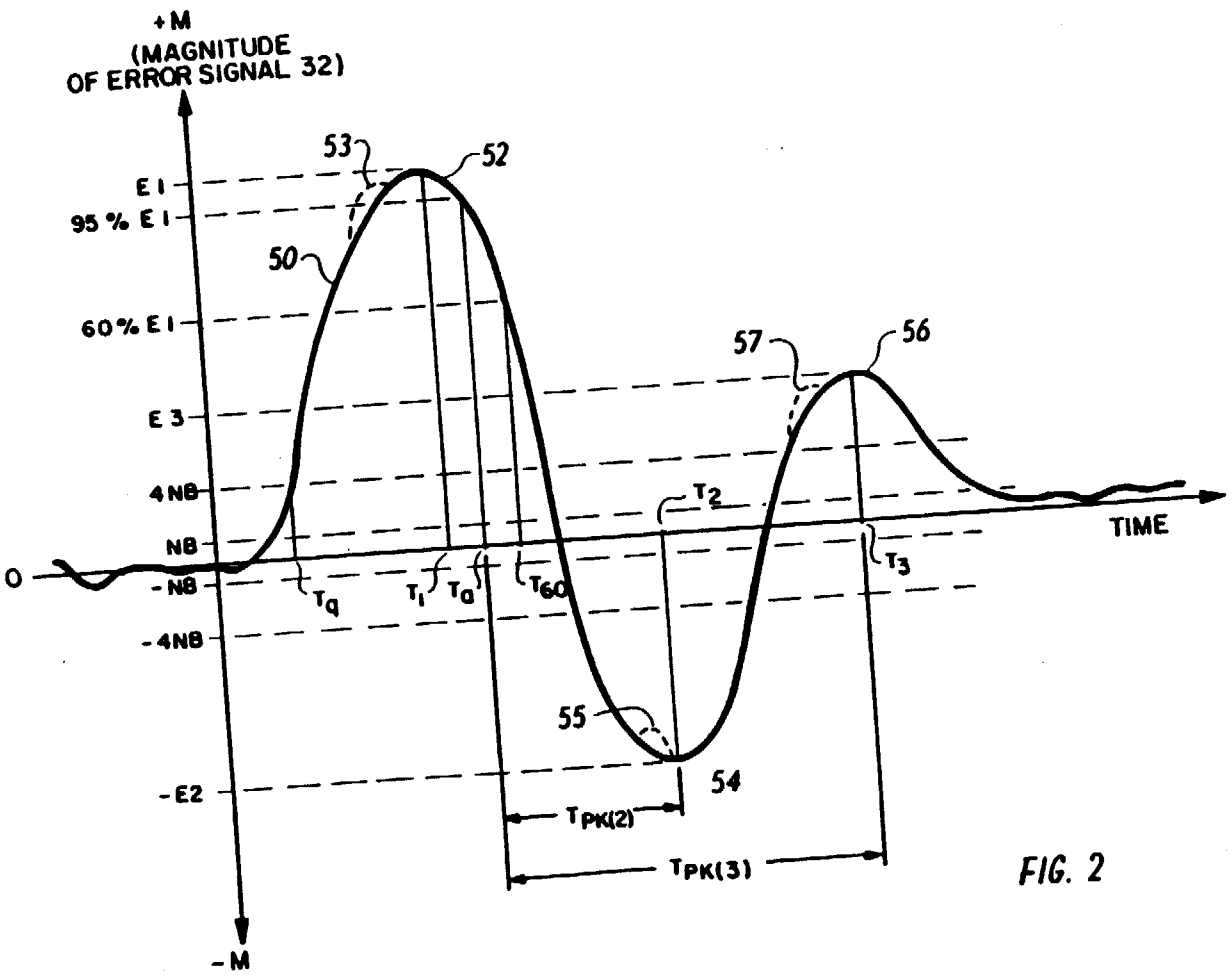
FIG. 2 is an illustration of the behavior of the error signal which is produced in the control loop depicted in FIG. 1A.

With reference to FIGS. 1A, 1B and 2, the behavior of the error signal 32 along a time base line represents the closed-loop response of the control loop 8 to an upset condition which causes a difference between the values of the measuring signal 18 and the set point 22. Typically, the upset condition is caused by either a load disturbance 26 (such as a change in ambient operating conditions) which suddenly changes the value of the process controlled variable 14 or a sudden change in the set point 22. Depicted in FIG. 2 is a plot of the error signal 32 as represented by a trace 50 for the purposes of illustration. The horizontal axis of the plot is time T and the vertical axis is M, the magnitude of the error signal representing the difference between the value of the process controlled variable 14 and its desired value represented by the set point 22. As can be seen, the trace 50 is characterized by three peaks, 52, 54 and 56 (also known as local extremums) having respective peak amplitudes E1, E2 and E3 and occurring respectively at times T1, T2 and T3. Eventually, the control loop 8 responds to the initial upset condition so that the magnitude M of the trace 50 becomes substantially equal to zero, corresponding to the condition where the process controlled variable 14 has been returned or changed to its desired value.

As can be understood, the closed-loop response of the control loop 8 (as represented by the behavior of the trace 50) can be specified in terms of damping, overshoot and time period which are performance measures that are well known to control engineers for describing the behavior of a control loop. In particular, damping DMP, overshoot OVR and the time period $T_0$ can be defined as follows:

$$DMP=(E3-E2)/(E1-E2)$$

$$OVR=E2/E1$$

$$T_0=T3-T1$$

As a result, the desired performance for the control loop 8 can be specified in terms of prescribed values for damping, overshoot and time period which in turn can be used to describe an ideal pattern for use to tune the self-tuning controller system 10. In other words, if the trace 50 matched the ideal pattern, the controller settings that produced the trace would be optimum. In applicant's invention, the ideal pattern preferably includes three peaks arranged so that the second peak occurs midway in the time interval between the occurrences of the first and third peaks.

It should be explained that the particular pattern of the trace 50 represents the situation where set point 22 was suddenly increased in value so that the positive error peak 52 is produced. If set point 22 were suddenly reduced in value, the first peak of error signal 18 would have a negative amplitude. However, an ideal pattern can still be specified using the same prescribed values for damping, overshoot and time period mentioned above except that the ideal pattern in the latter case would be the mirror image of the ideal pattern desired for the trace 50.

Depicted in FIGS. 3A and 3B through 8A and 8B is a flow chart which describes the logical operations of the adapter 34. The flow chart is usable by those skilled in the art for generating the computer software program which embodies the present invention. When the controller system is first switched into operation, as represented by the START block 60 in FIG. 3A, the adapter 34 implements the PERFORM INITIALIZATION function described in block 62.

The operation of self-tuning controller system 10 will now be described in connection with the trace 50 of FIG. 2 and the flow charts. Before the controller system is given control of the process 12, at least five initial inputs are required to be applied to input terminal 44 (of FIG. 1A). The five inputs are: three initial settings for the respective PID coefficients of the PID controller 42, one setting for the maximum wait time Wmax which is related to the approximate time scale of the process, and one setting for a nosie band NB. The noise band NB shown in FIG. 2 is preferably equal to one-half of the peak-to-peak value of the noise expected in the error signal 32. The desired values for the DMP and OVR performance measures can also be entered by the user. However, if those values are not entered, 0.3 and 0.5 will be used by the controller system for DMP(USER) and OVR(USER) terms. After completing the PERFORM INITIALIZATION function, the adapter 34 transmits the initial values the PID coefficients as part of the processor signal 40, which causes the PID controller 42 to set those initial values as the PID coefficients.

Generally, the operation of self-tuning controller system 10 can be described in nine states. The first state is the QUIESCENT MODE of block 63 which is associated with the condition where the magnitude M of the trace 50 is between upper and lower levels which are preferably centered about the time baseline. The upper and lower levels each has a magnitude preferably equal to four times the noise band NB. It should be recalled that the noise band NB is one of the initial inputs applied to the adapter 34 via input terminal 44. When in its first state, the self-tuning controller system 10 operates with the PID coefficients set in the PID controller 42 and performs the functions described in block 64 of FIG. 3A. So long as the value of the error signal 32 remains between the upper and lower levels (corresponding to the situation depicted in FIG. 2 where trace 50 is left of time $T_q$), no decisions are made regarding changes in the PID coefficients.

When the magnitude M of the trace 50 first exceeds the upper level (equal to 4NB), the controller system 10 changes into its second state which is the LOCATE PEAK 1 MODE of block 65 where the adapter 34 subsequently compares the magnitude M to a quantity designated as PK1 which is stored in a first peak storage register which is located in the RAM 406 (of FIG. 1B). With reference to loop 66 of FIG. 3B, if the magnitude M exceeds the stored quantity PK1, that stored quantity is changed to be equal to the magnitude M and the adapter 34 thereafter makes a new measurement of the error signal 32. As can be understood, when the magnitude M increases in value the quantity PK1 (which is initially equal to zero) will also increase accordingly until it becomes equal to the peak amplitude E1. When the magnitude M of trace 50 no longer exceeds the stored value and begins to decrease, no more updates are made to the register and the adapter 34 changes into its third state.

The third state begins at block 67 and is known as the VERIFY PEAK 1 MODE. In the present illustration, the trace 50 rises to a peak amplitude E1 which is positive. Accordingly, the SIGN of PK1 is set equal to +1. If the first peak of the error signal 32 was negative, the value of SIGN would be −1. SIGN is used in a later portion of the controller system. When the magnitude of a trace 50 falls to a level to 95% of E1, a timer (in the microprocessor 404 shown in FIG. 1B) has a value T (which is stored in the RAM 406 of FIG. 1B), is initialized to zero. The timer is a clock for measuring the time occurrence of each measurement of the magnitude M. Initializing the timer when M preferably equals 95% of PK1 helps to minimize the corrupting effect that control loop deadtime and noise have on the actual time occurrence and shape of the first peak. In other words, if the first peak does not have a well-defined local extremum value, the adapter is arranged to respond to a more specific event in which M is 95% of PK1. If trace 50 subsequently falls below 60% of E1 in accordance with diamond block 200, the time T60 (MEASURED) of that event is also stored for later use if certain conditions are satisfied.

When the value T of the timer exceeds the quotient of $T_0/4$ (the period $T_0$ divided by 4) or the magnitude of the trace 50 becomes less than E1/2 (the first peak amplitude divided by 2), the first peak 52 is marked as being verified and the controller system changes into its fourth state which will be discussed. It should be recalled that the second peak 54 is ideally expected at a time interval of $T_0/2$ after the occurrence of the first peak. Therefore, beginning the search for the second peak after an elapsed time of $T_0/4$ allows detection of that peak even if the actual period of the transient response was different by a factor of 2. Moreover, beginning the search for the second peak at the alternative condition where the magnitude of trace 50 is equal to E1/2 still allows detection of the second peak 54 if it happened to occur earlier than the elapsed time of $T_0/4$. This arrangement compensates for the situation where the frequency of the actual closed loop response is a much higher frequency than would be expected based on the initially calculated time period $T_0$. The other diamond blocks 68 and 69 of FIG. 3B will be explained later.

Figure 4A:
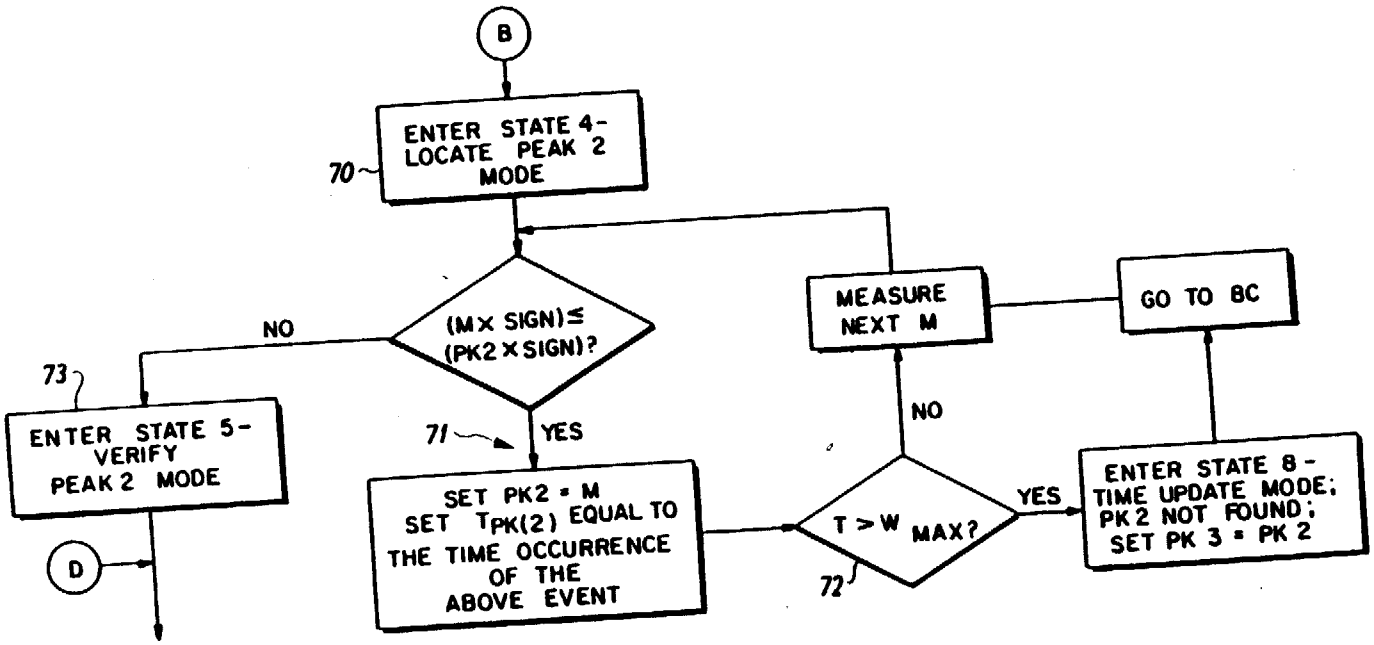

In the fourth state which begins at block 70 of FIG. 4A and is known as the LOCATE PEAK 2 MODE, the adapter 34 operates to detect the occurrence of a local minimum by comparing the magnitude M of the trace 50 to a quantity PK2 stored in the second peak storage register (which exists in the RAM 406 of FIG. 1B). If that magnitude M is less than the stored value, the quantity PK2 in the storage register is updated (set equal) to that magnitude M and the adapter 34 measures the next magnitude of the error signal 32. This process depicted as loop 71 of FIG. 4A will continue so long as the trace 50 decreases in magnitude. The loop 71 includes a diamond block 72 which will be explained in a later portion of this description. When the magnitude of trace 50 first reaches its local minimum value E2, the quantity PK2 is set equal to E2 and the time occurrence of the peak 54 as determined by the value T of the timer is stored in a second peak time register (which exists in the RAM 406 of FIG. 1B) as a quantity $T_{PK(2)}$. Thereafter, when the next measurement of the magnitude M has been made after the peak 54 has occurred, the adapter 34 changes into its fifth state.

The fifth state begins at block 73 of FIG. 4A and is known as the VERIFY PEAK 2 MODE. As described in blocks 74 and 75 of FIG. 4B, when the time since locating the second peak 54 exceeds an interval equal to $T_0/4$ or the magnitude of the trace 50 becomes less than E1/4, the second peak 54 is marked as verified and the controller system changes into its sixth state.

Figure 5A:
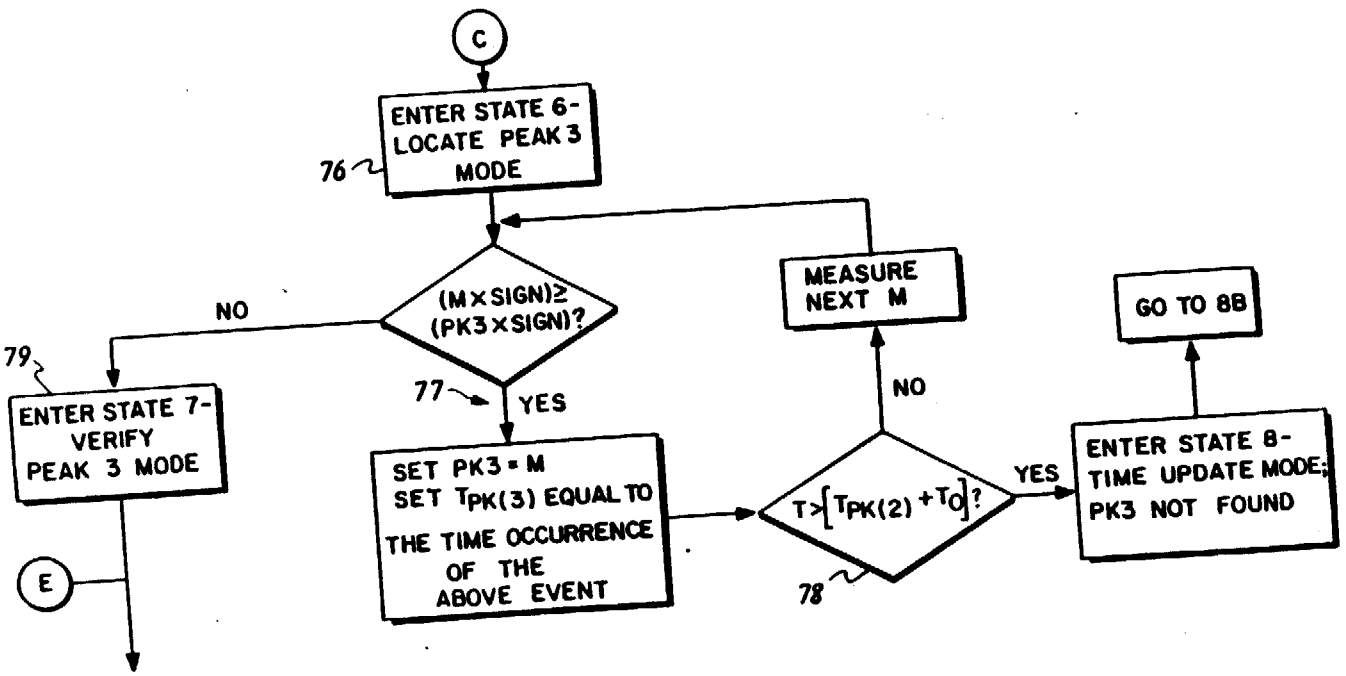

The sixth state begins at block 76 of FIG. 5A and is known as the LOCATE PEAK 3 MODE, where the adapter 34 is searching for a local maximum by comparing the magnitude M of the trace 50 to a quantity PK3 stored in a third peak storage register (which exists in the RAM 406 of FIG. 1B). If that magnitude M exceeds the stored value, the quantity PK3 is set equal to that magnitude and the adapter 34 measures the next magnitude of the trace 50. This process depicted in loop 77 will continue so long as the trace 50 increases in magnitude. When the trace 50 reaches its local maximum value, E3, the quantity PK3 is set equal to E3 and the time occurrence of the peak 56 as determined by the value T of the timer is stored in a third peak register (which exists in the RAM 406 of FIG. 1B) as a quantity $T_{PK(3)}$. Thereafter, the adapter 34 changes into its seventh state. A diamond block 78 included in loop 77 will be explained later in more detail.

Figure 5B:
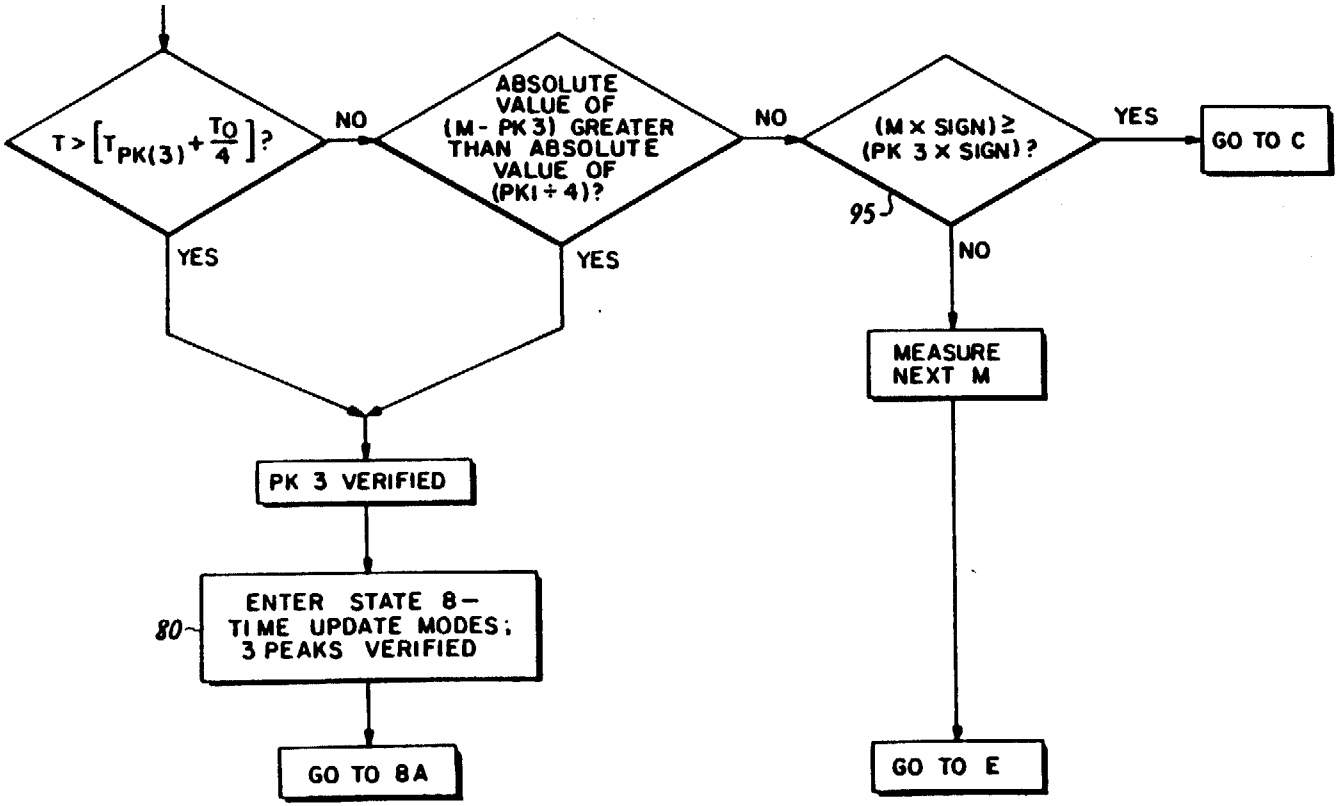
Figure 6A:
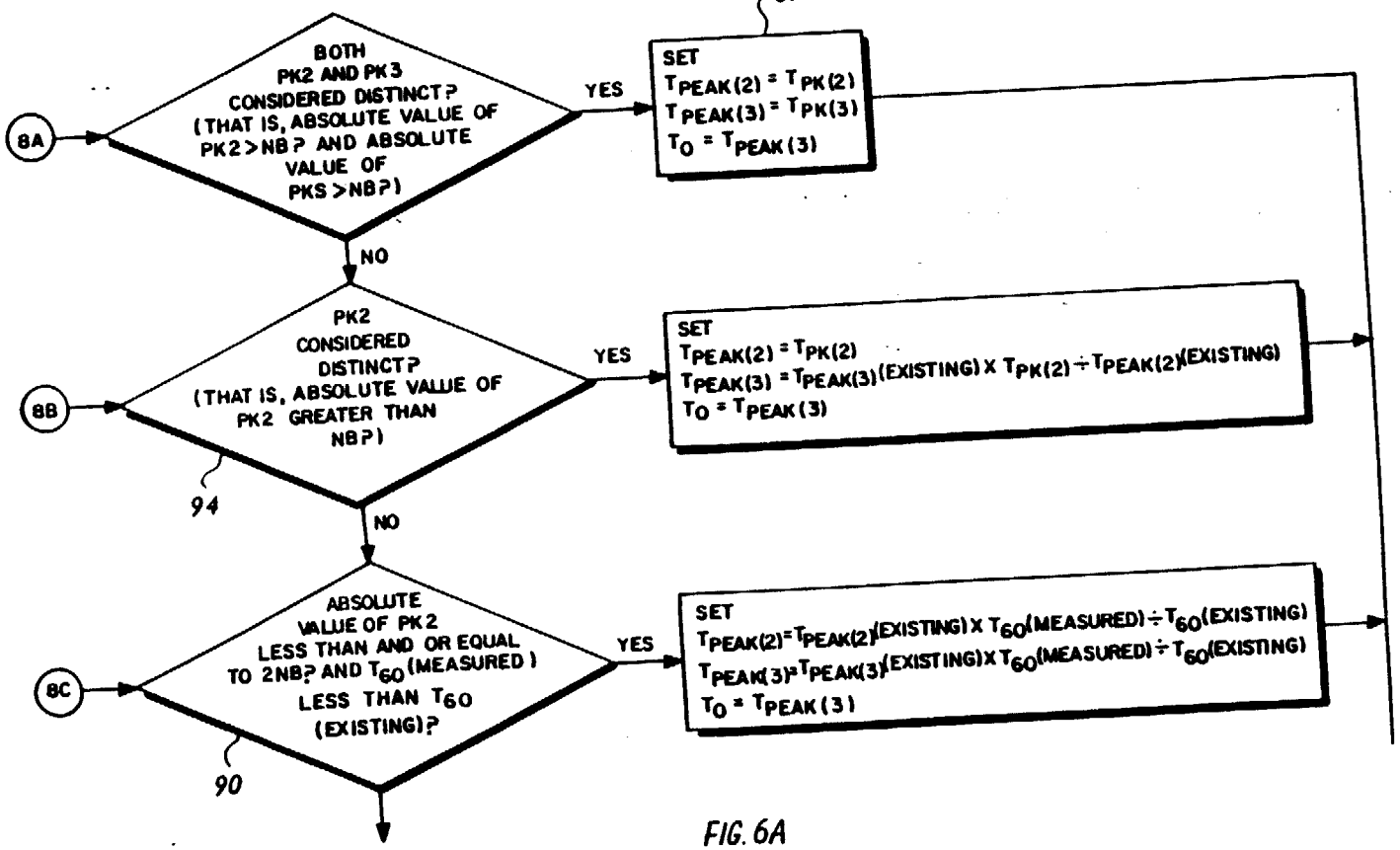
Figure 6B:
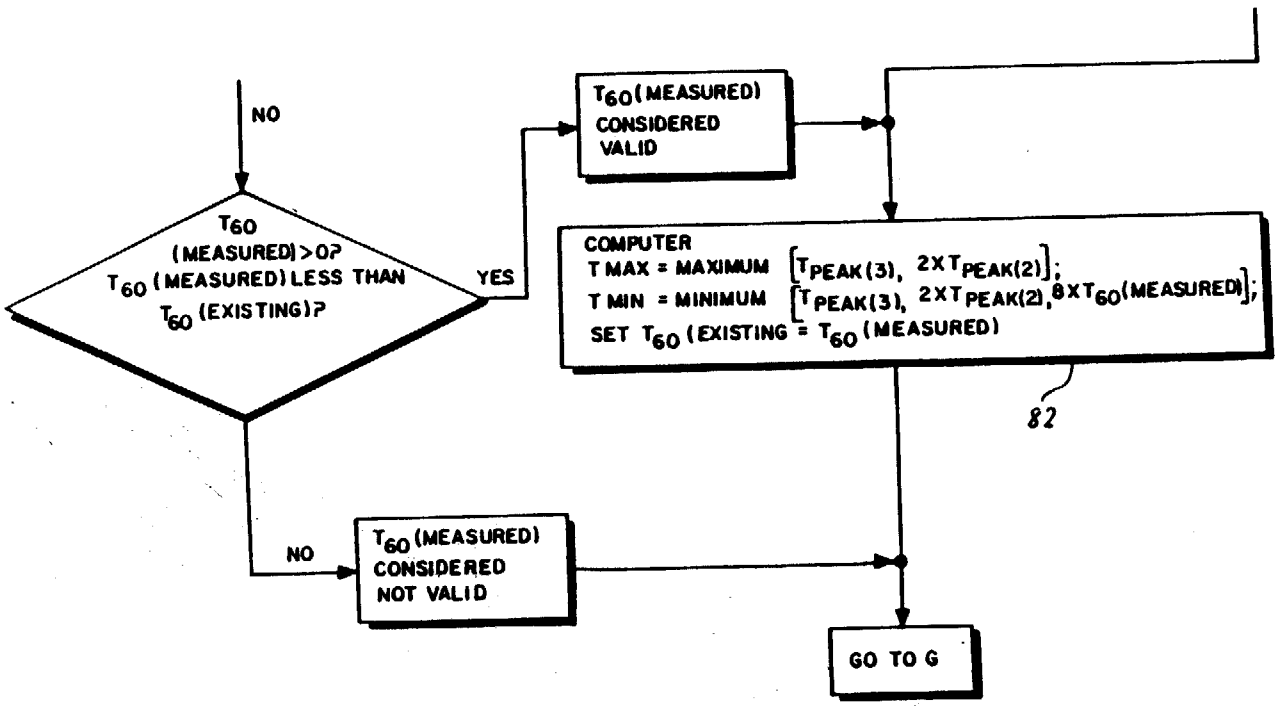

The seventh state begins at block 79 and is designated as the VERIFY PEAK 3 MODE. With reference to FIG. 5B, when the time since locating peak 56 exceeds a time interval equal to $T_0/4$ or the magnitude of the trace 50 becomes less than E1/4, the third peak 56 is marked as verified. Once the third peak has been verified, the adapter 34 changes into its eight state which begins at block 80 of FIG. 5B and is known as the TIME UPDATE MODE. In the present illustration and with reference to FIG. 6A, the three peaks 52, 54 and 56 are all considered distinct since E1 is greater than 4NB, E3 is greater than NB and E2 is less than −NB. As a result, the adapter 34 performs the operations in block 81 and sets the values of variables $T_{PEAK(3)}$, $T_{PEAK(3)}$, and a period $T_0$ using the quantities $T_{PK(2)}$ and $T_{PK(3)}$. Thereafter, two intermediate times $T_{MAX}$ and $T_{MIN}$ are calculated in accordance with block 82 of FIG. 6B, where the notation $T_{MAX}$=maximum (x, y) refers to the logical operation in which the quantities x, y in the parentheses are compared with one another and the quantity having the largest value is then set equal to $T_{MAX}$; and the notation $T_{MIN}$=minimum (x, y, z) refers to the logical operation in which the minimum quantity of quantities x, y, z is set equal to $T_{MIN}$.

Figure 7:
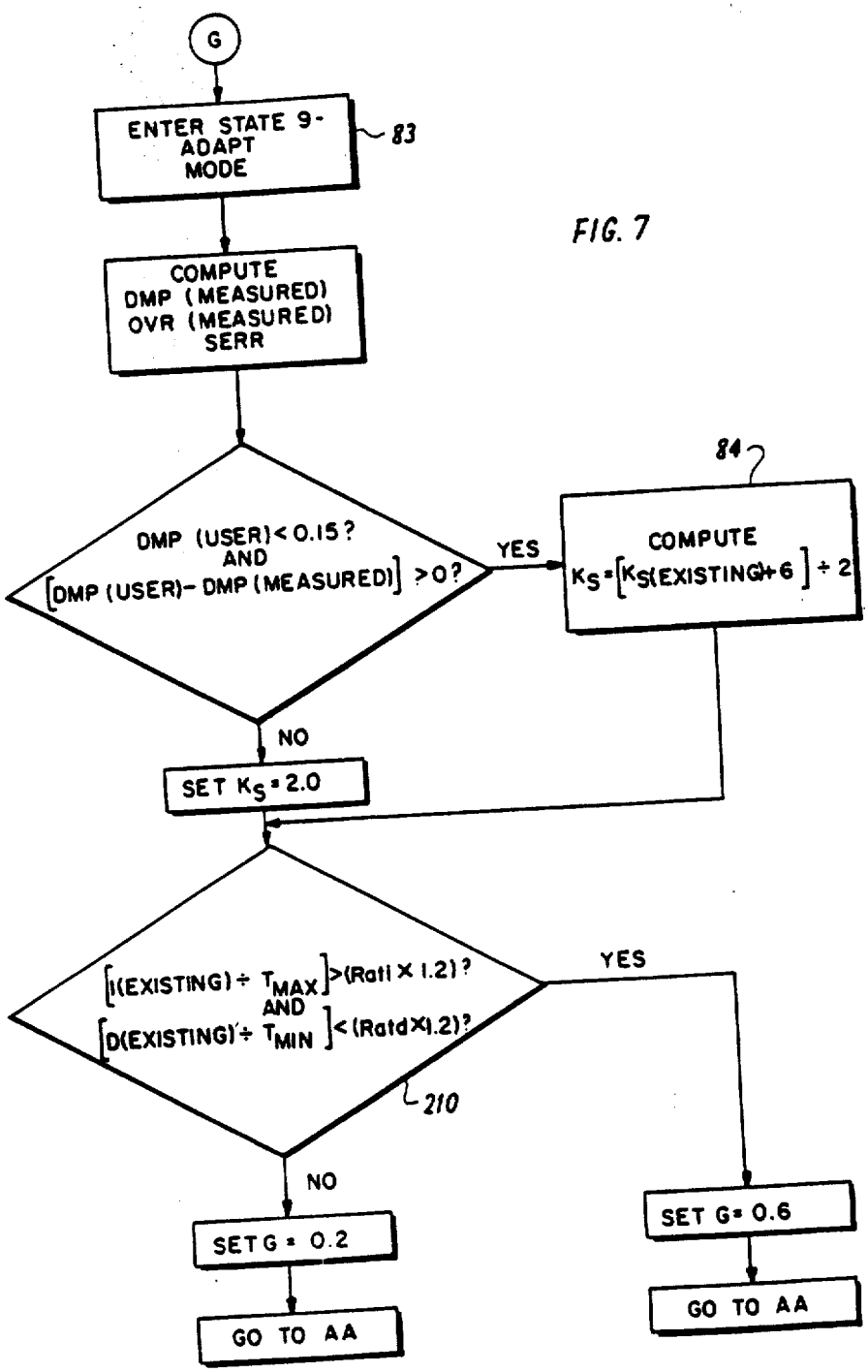

After calculating the two intermediate times, the adapter 34 enters a ninth state known as the ADAPT MODE of block 83 shown in FIG. 7. Based on the measured peak amplitudes E1, E2 and E3, the adapter calculates the previously defined damping and overshoot performance measures which are identified as DMP (MEASURED) and OVR (MEASURED) respectively. In general, three steps are taken in the ADAPT MODE for determining the new PID coefficients. The steps are:

1. the Ziegler-Nichols ratios (to be defined) are adjusted based upon the pattern shape of the error signal 32;
2. the PID coefficients are changed based upon the adjusted period and the adjusted Ziegler-Nichols ratios; and
3. the PID coefficients are also changed based upon desired constraints for the damping and overshoot terms.

As further explanation, the adapter 34 makes a shape error SERR calculation in which SERR=the smallest value between A or B, where
A=DMP (USER)−DMP (MEASURED)
B=OVR (USER)−OVR (MEASURED) or DMP (USER) and OVR (USER) were set during the PERFORM INITIALIZATION operation of block 62.

Figure 8A:
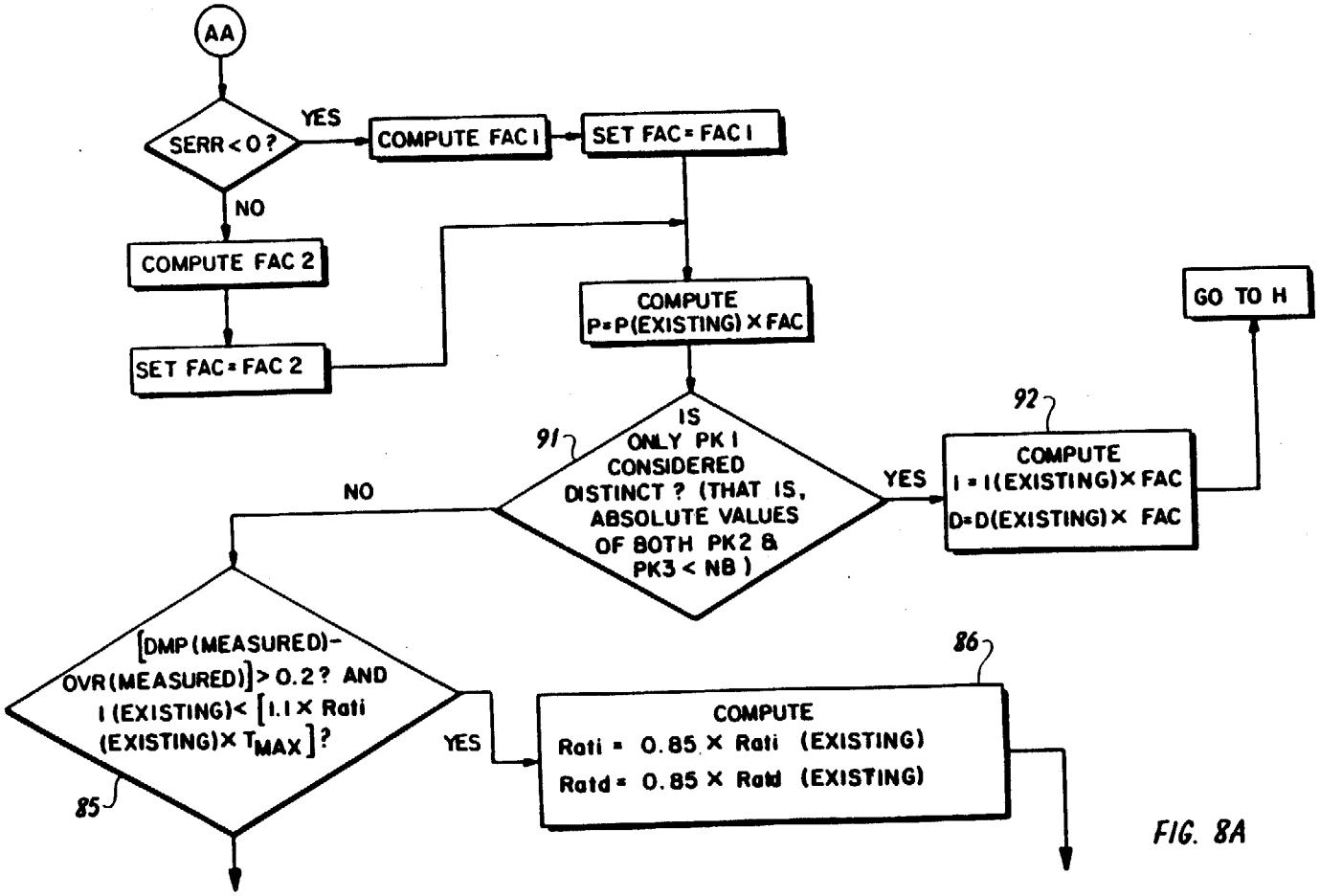

In applicant's invention, the values of DMP (USER) and OVR (USER) are usually manually set by the human operator (i.e., the user). These values are thus part of the initializing signal 46. If the human operator decides not to set the values of DMP (USER) and OVR (USER), the adapter 34 is arranged so that 0.3 is used for DMP (USER) and 0.5 is used for OVR (USER). As shown in FIG. 8A, a shape adjustment factor FAC is first calculated based on the following relationships:

If $SERR<0$, $FAC=FAC1=1.0+K_s(SERR-G)SERR$; and if $SERR<0$, $FAC=FAC2=1.0/[1.0\times K_s(SERR-0.3)SERR]$.

Returning to FIG. 7, it should be explained that the value of $K_s$ is either 2.0 or a value:

$$K=(K_{i-1}+6.0)/2.0$$

where the index i ranges from 1 to the number n of consecutive cycles of the error signal 32 (of which the trace 50 is one cycle) where the performance measures are described by the following inequalities:

$$DMP\ (USER)<0.15; \quad (1)$$

$$DMP\ (USER)-DMP\ (MEASURES)>0 \quad (2)$$

and where DMP ($MEASURED_i$) is the damping term calculated based on the particular response associated with i. As further explanation, if the trace 50 was not described by the two inequalities (1) and (2), then $K_s=2.0$. However, if the trace 50 was the first trace described by the two inequalities (1) and (2), then $i=1$ and $K_1=(K_0+6.0)/2.0$. Since $K_0$ is prescribed to be equal to 2.0, then $$K_1=(2.0+6.0)/2.0=4.0.$$

If the next trace after the trace 50 is also described by the two inequalities, then $i=2$ and $$K_2=(K_1+6.0)/2.0=(4.0+6.0)/2.0=5.0.$$

The notation used in block 84 represents the arrangement described above where $$K_s(EXISTING)=K_{i-1}.$$

Being either 0.2 or 0.6, the value of the constant G is based on a relationship to be described in a later section where the quantities in diamond block 210 are defined.

After determining the value of FAC, the adapter now calculates a new proportional coefficient P as follows:

$$P=P(EXISTING)\times FAC,$$

where P(EXISTING) is the present proportional coefficient (that is used in the PID controller 42) which resulted in the trace 50.

Returning to FIG. 8A, it should be recalled that the three peaks of the trace 50 are all considered to be distinct peaks so that the adapter 34 leaves block 91 and next enters diamond block 85. It should be pointed out that Rati and Ratd are ratios which are known to control engineers as the Ziegler-Nichols ratios. The ratios are defined as I/period and D/period. It is also known in the prior art that controller tuning can be based on the Ziegler-Nichols ratios having fixed values such as 0.5 and 0.12 for the respective integral I and derivative D coefficients of the controller. However, such control criteria still have limited applications since the time period of the error signal 32 is influenced by the actual settings for the I and D coefficients. In the present invention the measured time period $T_0$ of the trace 50 is adjusted in accordance with changes in the I and D coefficients and are not constrained to equal fixed values.

As further explanation of the above and in connection with FIG. 8A, the adapter 34 includes logic for making the following determinations:

If $DMP(MEASURED)-OVR(MEASURED)>0.2$ and, $I(EXISTING)<1.1\times Rati(EXISTING)\times T_0$; then $Rati=85\%\times Rati(EXISTING)$; and, $Ratd=85\%\times Ratd(EXISTING)$.

Figure 8B:
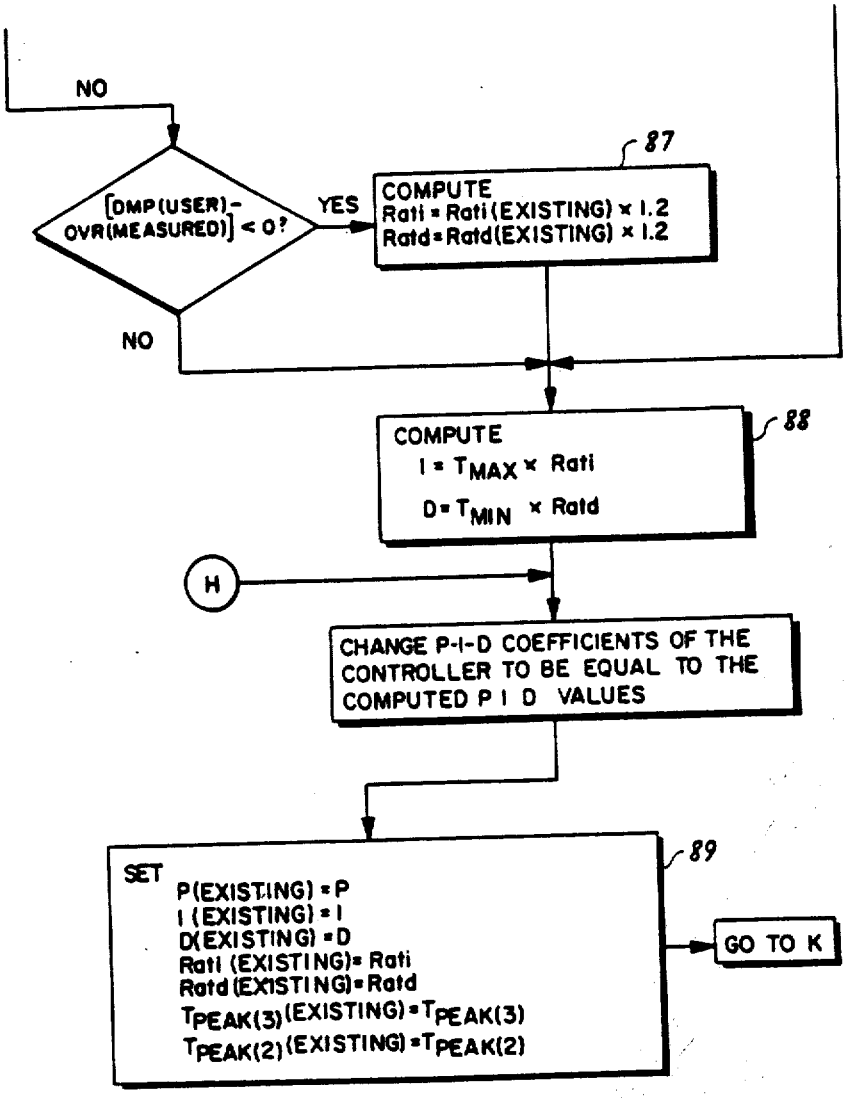

However, with reference to FIG. 8B, if the following occurs;

If $DMP(MEASURED)-OVR(MEASURED)<0$, then $Rati=1.2\times Rati(EXISTING)$ $Ratd=1.2\times Ratd(EXISTING)$ The adapter eventually enters block 88 where the new values for Rati and Ratd are used to calculate new values for the I and D coefficients as follows:

$I=T_{MAX}\times Rati$; and $D=T_{MIN}\times Ratd$.

Once the new values of the proportional P, integral I, and derivative D coefficients have been calculated, the adapter 34 transmits those values to the PID controller 42 as the processor signal 40 so that the new settings are made to the controller. Thereafter, certain variables are redefined in accordance with block 89 and the adapter 34 returns to its first state and waits for another cycle of the error signal causes by a new upset condition applied to the process 12. It should be understood that a new cycle only begins when the absolute value of the magnitude M of the error signal 32 exceeds 4NB. The dynamic characteristics of the controller system 10 have now been changed so as to improve its response to the next upset condition. Based on the above discussion, the variables mentioned in the block 210 of FIG. 7 are known so that the value of the constant G can then be calculated in accordance with the conditions described in the block 210.

With reference to state three (block 67 of FIG. 3B), the purpose of diamond block 68 was not explained. If the trace 50 of FIG. 2 included a noise spike 53, the adapter 34 would recognize the spike 53 as a local maximum. Accordingly, the value of PK1 would be set equal to the amplitude of peak 53, and the true peak 52 would be lost. Thus, in order to avoid this undesirable result, the adapter 34 includes the diamond block 68 so the noise spikes occurring prior to the true first peak of the trace 50 are substantially ignored. As further explanation, if the magnitude M is subsequently greater than PK1, the adapter returns to state 2.

The state 3 also includes a diamond block 69. It should be recalled that $W_{MAX}$ was initially set during the initialization stage of the adapter operation. The $W_{MAX}$ is related to the estimated maximum time scale for the process 12. However, if the controller 42 is tuned to be very sluggish, the control loop 8 may take an inordinate time for responding to an upset condition. In other words, period $T_0$ is relatively large in comparison to $W_{MAX}$. In such case, the adapter 34 includes a provision for retuning the controller 32 when a sluggish condition has been encountered. Thus, if the time since the adapter 34 first entered state 2 exceeds $W_{MAX}$, the adapter then enters state 8 and proceeds to perform the operations described in diamond block 90 of FIG. 6A. For that figure it can be seen that the values of various variables are then calculated based on the characteristic of $T_{60(MEASURED)}$ if it exists and on previous data derived from the data of a prior response. In the illustration involving the trace 50, there was no previous evaluation since the trace 50 was the first response occurring after the controller system 10 was first switched into operation. Accordingly, the initial values for the previous data are the values that result when the PERFORM INITIALIZATION block was completed. After the adapter has completed block 89 of FIG. 8B, the variables associated with "(EXISTING)" in the diamond block 90 will have defined values which become the previous data mentioned above and replace the initially set values.

Figure 3A:
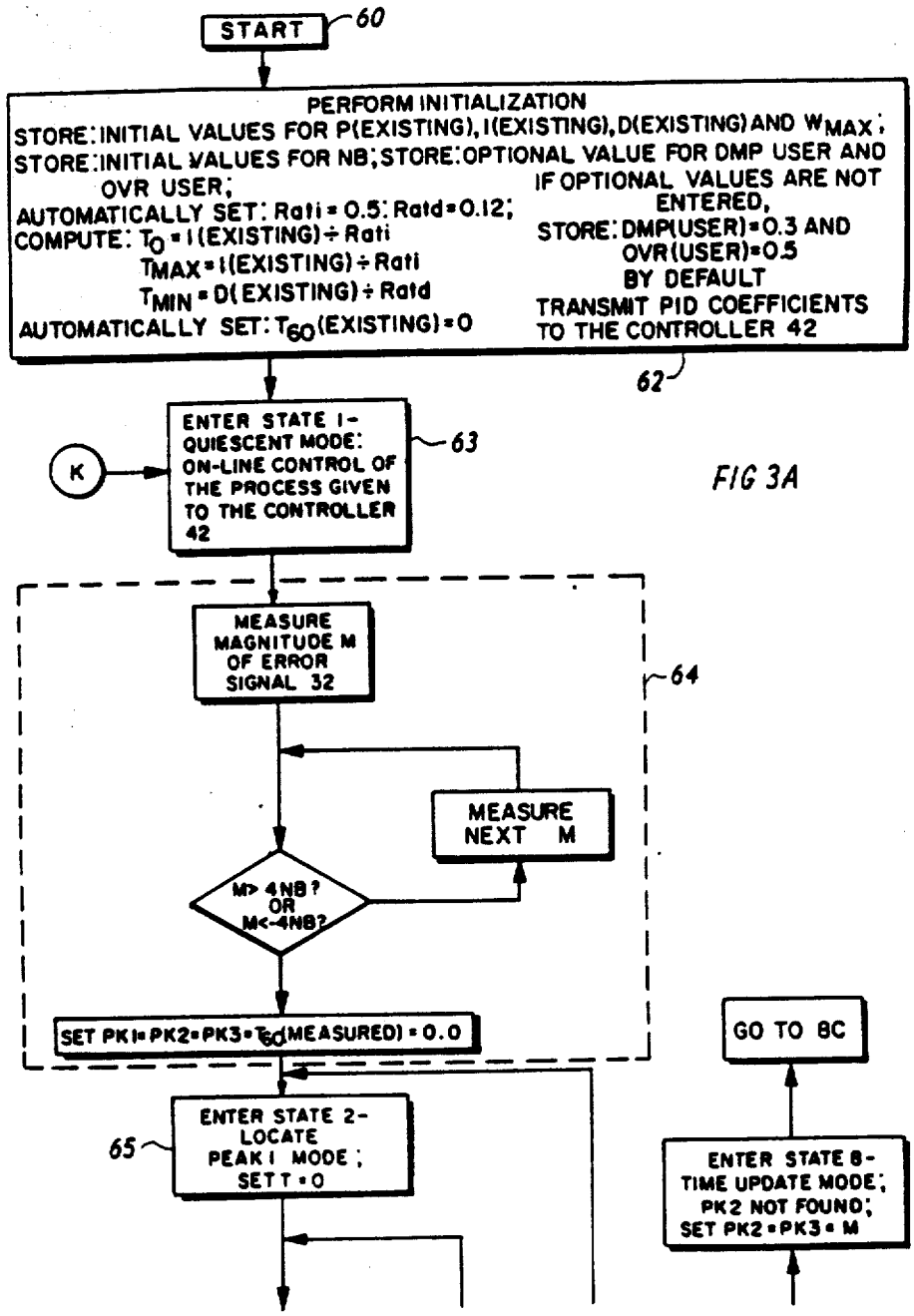
Figure 3B:
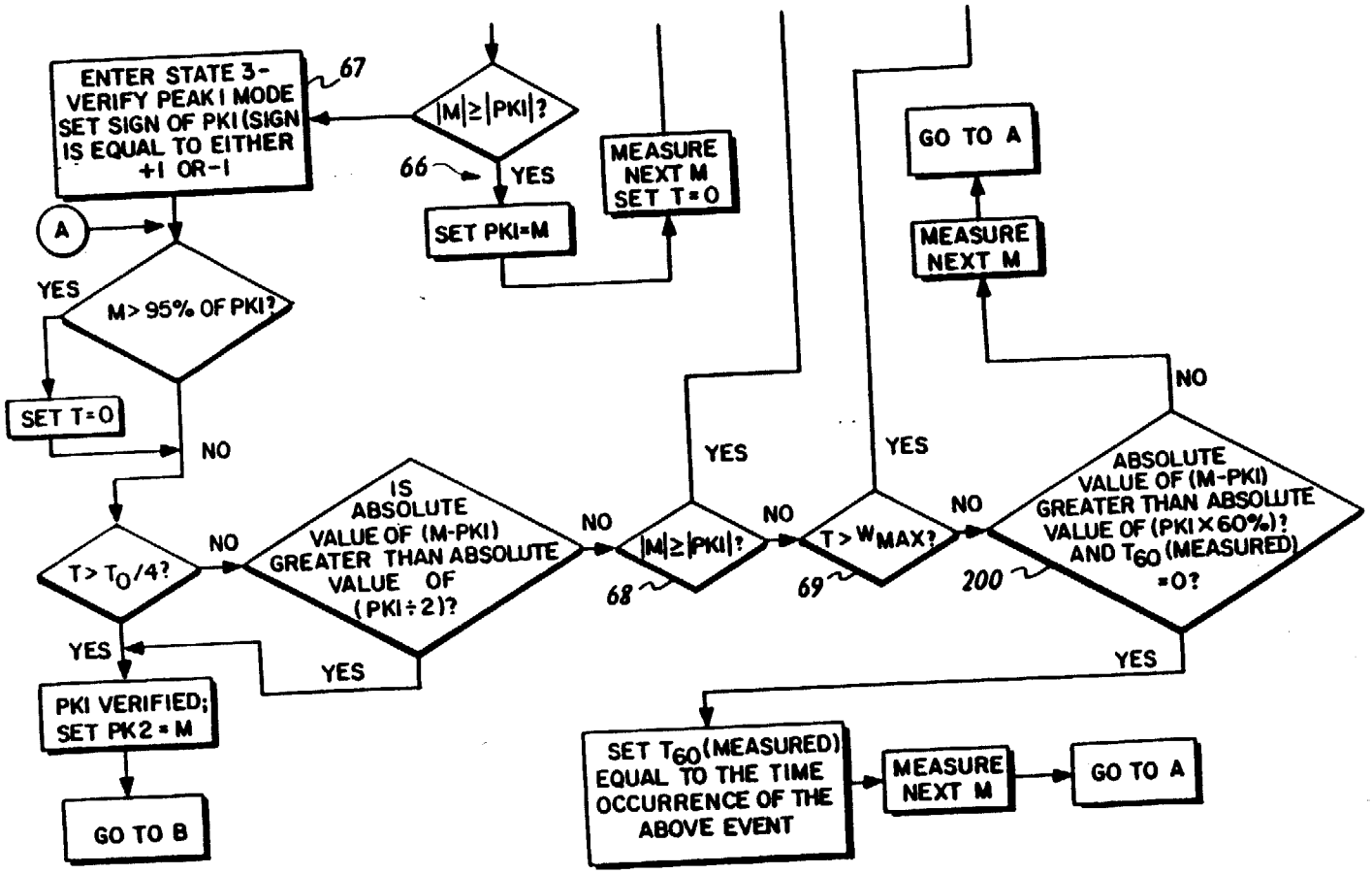

With reference to FIGS. 3A and 3B and to the discussion regarding the diamond block 69, the adapter enters state 8 via input 8C. As described in diamond block 91 of FIG. 8A, if only PK1 is considered distinct, new values of the I and D coefficients are calculated in accordance with block 92. However, if the magnitude M of the error signal 32 only slowly decreases from a first peak corresponding to the situation "NO" where the absolute values of PK2 and PK3 are each greater than NB, the new I and D coefficients are based on the block 88 of FIG. 8B which includes the intermediate times $T_{MAX}$ and $T_{MIN}$ as well as adjusted Ziegler-Nichols ratios.

State 4 includes a diamond block 72 shown in FIG. 4A. This arrangement is for the situation in which the second peak does not occur before the time T (with respect to the occurrence of 95% of PK1) has exceeded $W_{MAX}$. IN such case, the adapter 34 then enters state 8 via input 8C and proceeds in a manner previously discussed. This arrangement compensates for the previously mentioned case where the controller is sluggish.

Figure 4B:
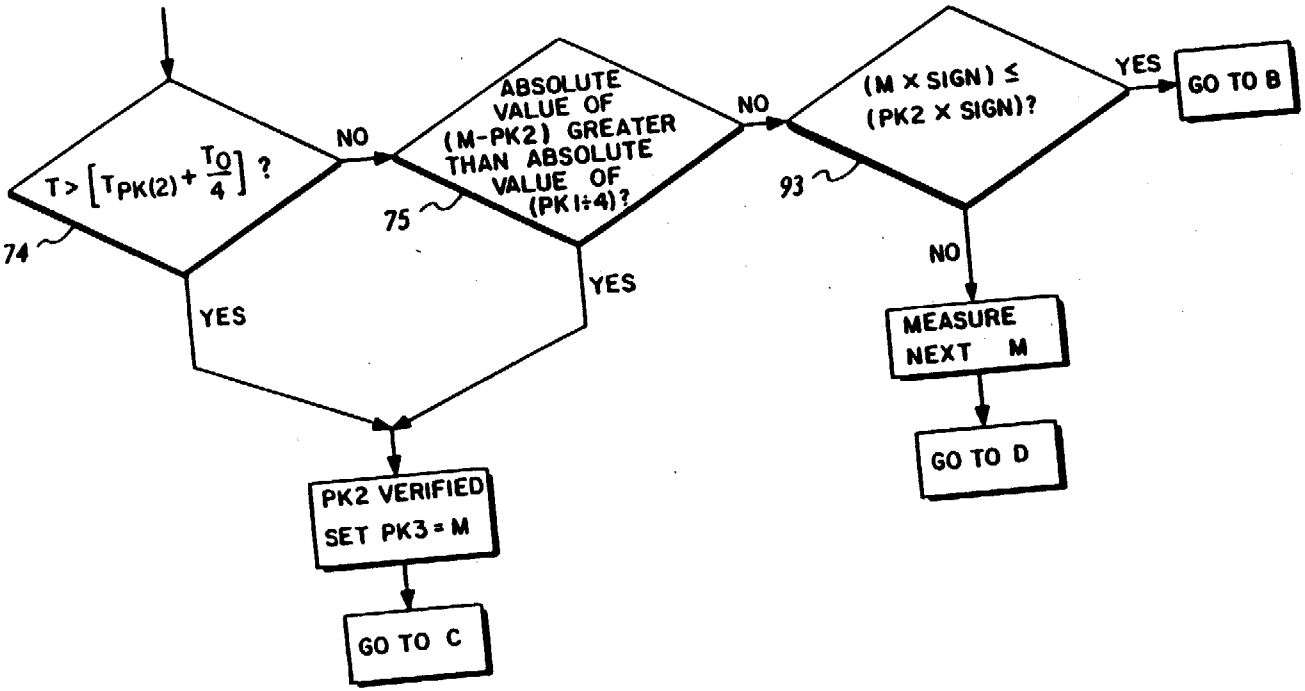

When the adapter is in state 5, a diamond block 93 is included in its operation as depicted in FIG. 4B. If the trace 50 of FIG. 2 included a noise peak 55, the adapter would recognize the peak 55 as a local minimum and not detect the true second peak 54. The use of the diamond block 93 avoids this undesirable situation since adapter 34 will ignore noise peak 55 in a manner similar to that previously described in connection with the diamond block 68.

When the adapter is in state 6 of FIG. 5A, its operation includes diamond block 78. If a third peak has not been found within the time interval specified in the diamond block 78, then the adapter enters state 8 via input 8B. Thereafter, the adapter continues its logical operation starting from a diamond block 94 of FIG. 6A.

A diamond block 95 of FIG. 5B is included in the operations of the adapter when it is in state 7. If the trace 50 of FIG. 2 included a noise spike 57, the adapter would recognize the peak 57 as a local maximum and would miss detecting the true third peak 56. The diamond block 95 is included for avoiding this undesirable situation since the adapter will now ignore noise peak 57 in a manner similar to that described in connection with the diamond block 68.

It should be understood from all of the above that the present invention operates with information based on three characteristics of the behavior of the process controlled variable 14 when the control loop 8 is responding to an upset condition. The three characteristics are preferably amplitude information based on the existence of three distinct peaks. However, provision is made for determining these characteristics if only two peaks are detected or if only one peak is detected. Three characteristics are needed for calculating the damping constraint. However, if the controller 42 is only operated based on an overshoot constraint, only two characteristics are needed for measuring the overshoot performance of the control loop 8. If only one peak exists, the present invention generates the second and third characteristics based on the values of the error signal at the time when the search was aborted.

In the preferred embodiment of applicant's invention, provision is also made for a pre-adapt mode wherein various process characteristics are automatically identified so that initial settings of the P, I and D coefficients, the maximum wait time, and the size of the noise band NB can be determined. The pre-adapt mode therefore obviates the need for the human operator to enter manually the initial settings. In the pre-adapt mode, the controller system 10 is in a special manual state wherein the control loop is opened so that the set point is no longer being used by the PID controller 42. With reference to FIG. 1A, the controller system is put into the manual mode by activating the switch 110 so that it disconnects the sensor 16 from the comparator 30 and connects the sensor to a conventional analog-to-digital (A/D) converter 170 which is coupled to a pre-adapter 112. The pre-adapt mode requires that the process is in a first steady state condition. The pre-adapter 112 transmits a signal to the controller 42 which results in the process controlled variable 14 being changed (perturbed) to a new value that is preferably at least 3% different from the previous steady state value. When the process 12 reaches its new steady state condition or the process controlled variable 14 changes 10%, the process is returned to its initial steady state value.

Figure 9:
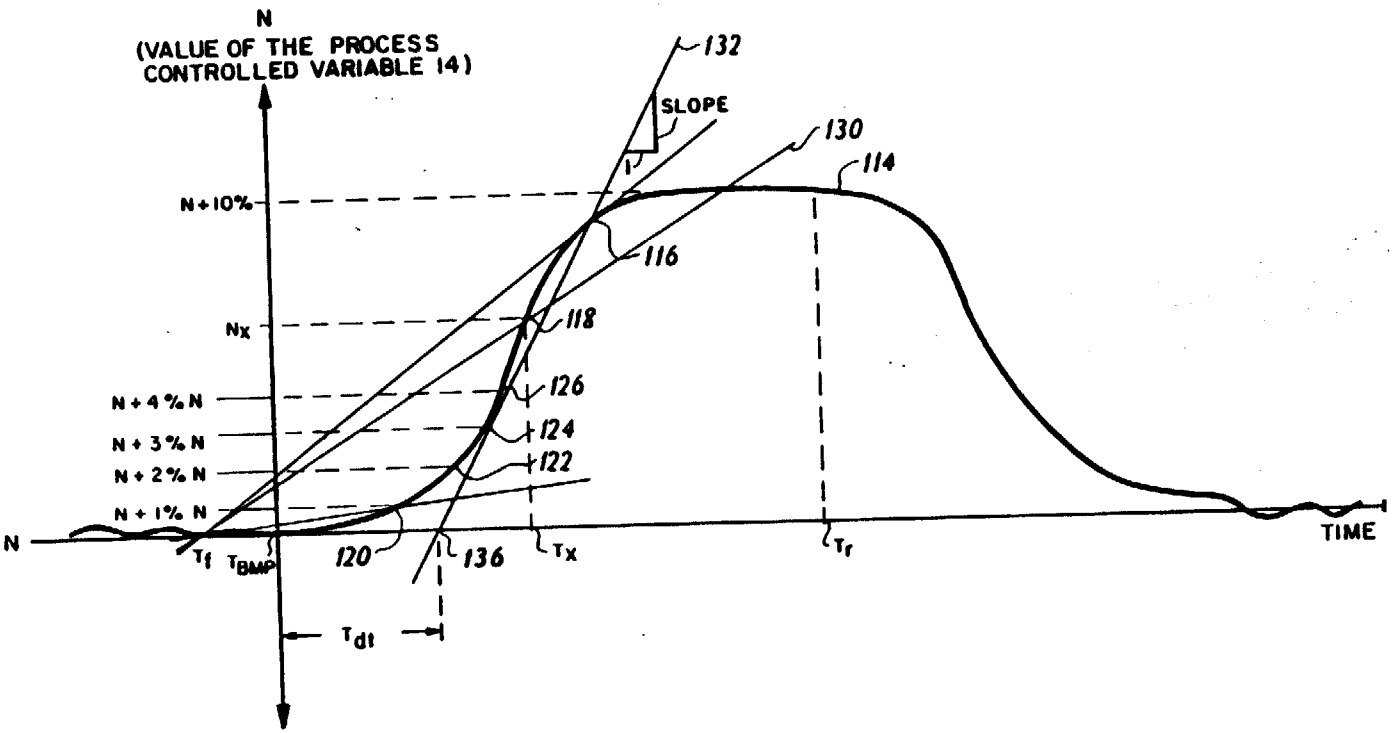
FIG. 9 is a plot of amplitude versus time of the behavior of the process controlled variable used in appliant's invention.

Depicted in FIG. 9 is a plot of the value of the process controlled variable 14 versus time (in minutes). A trace 114 represents the response of the process 12 when the process control variable 14 is "bumped" from a steady state value of N to a new level that is 10% greater than N. It should be understood that the trace 114 is one example of the response and is being used solely to explain the operation of the controller system 10 when it is in its pre-adapt mode.

At a time designated as $T_{BMP}$, the process 12 is bumped and the pre-adapter 112 tracks the resulting trace 114. The pre-adapter records the time occurrences of prescribed points 120, 122, 124 and 126 where the corresonding magnitudes thereof are N+1% N, N+2% N, N+3% N and N+4% N respectively. Furthermore, the pre-adapter determines an inflection point 116 of the trace 114 preferably by a technique to be described and hereinafter known as the chord method.

As further explanation, a point $T_f$ is selected on the horizontal axis which is a low time baseline at which the process 12 is in the first steady state condition. Each time when the pre-adapter 112 is making a measurement of the process controlled variable, the pre-adapter also determines the slope of a line which connects point $T_f$ and the point on the trace 114 representing the measurement. For example, if the current measurement time is $T_x$ and the corresponding measured magnitude of the process controlled variable is $N_x$, a point 118 is determined. The slope of the line designated as chord 130 connecting point $T_f$ and 118 is easily calculated since the respective coordinates (time and magnitude) are known. As can be understood, when point 118 approaches an upper inflection point 116, the slope of the associated chord approaches maximum value. The accuracy with which the above-described chord method determines the upper inflection point of the trace 114 depends upon the actual location of $T_f$. In a specific embodiment of the present invention, point $T_f$ was located 15 seconds prior to the time $T_{BMP}$.

Once the pre-adapter has determined the upper inflection point 116, it then finds the line having maximum slope from the four lines which extend from the inflection point 116 and the points 120, 122, 124 and 126 respectively. In the present illustration a line 132 is the line of maximum slope. The intercept point 136 of line 132 with the low time baseline is used to represent the dead time $T_{dt}$ of the process 12. It is known that line 132 is proportional to a characteristic known to control engineers as process sensitivity. In the present invention, process sensitivity SEN is calculated by multiplying the slope (designated as SLOPE) of line 132 by the percent change in the controller signal 20 (of FIG. 1A) which resulted in the process controlled variable being bumped from the first low steady state condition to the new steady state condition.

Based on the above characteristics of the trace 114, the initial PID coefficients and $W_{MAX}$ are calculated by the pre-adapter 112 as follows:

$$P(EXISTING)=120\times T_{dt}/SEN$$

$$I(EXISTING)=1.5\times T_{dt}$$

$$D(EXISTING)=I(EXISTING)/6$$

$$W_{MAX}=5.0\times T_{dt}.$$

The above values are transmitted not only to the controller 42 but also the adapter 34 so that the operation of block 62 of FIG. 3A can be performed when needed.

After a time $T_r$, the process 12 is returned to its first low steady state condition. The pre-adapter 112 then observes the value of the process control variable 14 for three minutes in order to determine the peak-to-peak noise band which is equal to 2NB.

Figure 10:
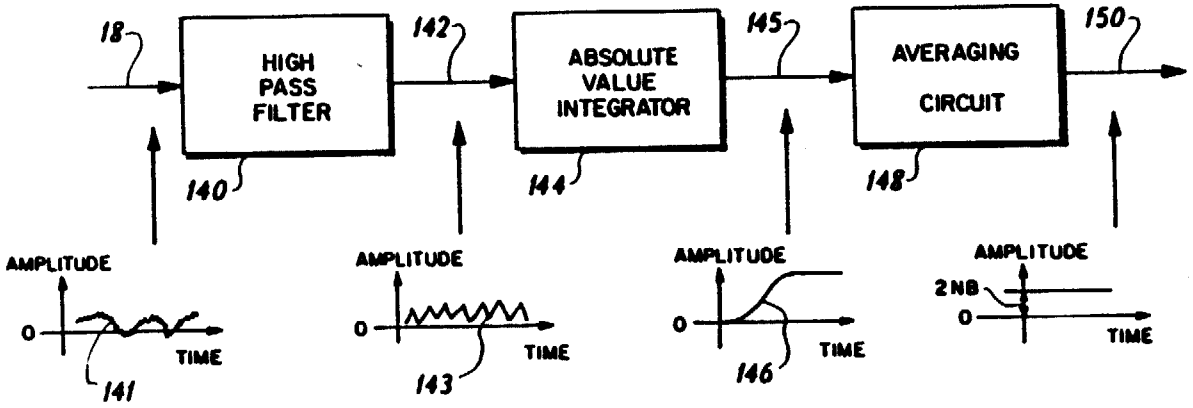
FIG. 10 is a block diagram of the noise band circuit used in applicant's invention for determining the noise level.

FIG. 10 depicts in block diagram form the noise band circuit used in applicant's invention for determining the noise band 2NB. The process 12 has been returned to its initial low steady state condition. The measured variable 18 (shown in FIG. 1A) is applied to an input of a high pass filter 140 which is a well known device for removing the low frequency portions in the measured variable 18 and represented by a trace 141. The break frequency of this filter is variable and preferably set to equal 3 times $T_{dt}$. An output signal 142 which is depicted as trace 143 is applied to an absolute-value integrator 144 which integrates the output signal 142 for a period preferably equal to three minutes and produces a signal 145 depicted as a trace 146. A conventional averaging circuit 148 receives the signal 145 and determines an average thereof by multiplying signal 145 by four and dividing by the integrator period of 3 minutes used by the integrator 144. The magnitude of a resulting signal 150 produced by the averaging circuit 148 is the peak-to-peak noise band 2NB of the process 12. It should be explained that the factor of four used in the averaging circuit is based on an approximation of the result if signal 141 were a sine wave. The resulting signal 150 is transmitted to adapter 34 for use therein when needed.

The pre-adapter 112 also includes logic for calculating a new initial value for the D(EXISTING) coefficient as necessary based on the size of the noise band 2NB. As further explanation, that logic performs the following operations:

calculate a quantity $Z=(3.0-2NB)/2.5$;

if $Z>1$, then set $D(EXISTING)=I(EXISTING)/6$ (in other words, the initial value is unchanged from that previously calculated);

if $Z<0$, then set $D(EXISTING)=0$; and if $0<Z<1$, then set $D(EXISTING)=I(EXISTING)\div 6\times Z$.

Once the pre-adapt mode has been completed, the controller system 10 is returned to its QUIESCENT MODE.

The pre-adapter 112 is preferably embodied as a computer software program which can be generated from the functions and operations described above (in connection with FIGS. 9 and 10) by those skilled in the art. With reference to FIG. 1B, the program embodying the pre-adapter is stored in the EPROM 408 which is used by the microprocessor 404. The various data and information received, generated and produced by the pre-adapter 112 are stored in the RAM 406.

It should be pointed out that even though the adapter 34 responds to the closed-loop response of the control loop 8, the open loop response thereof is also usable since the pre-adapter 112 is also a self-tuning controller.

Figure 11:
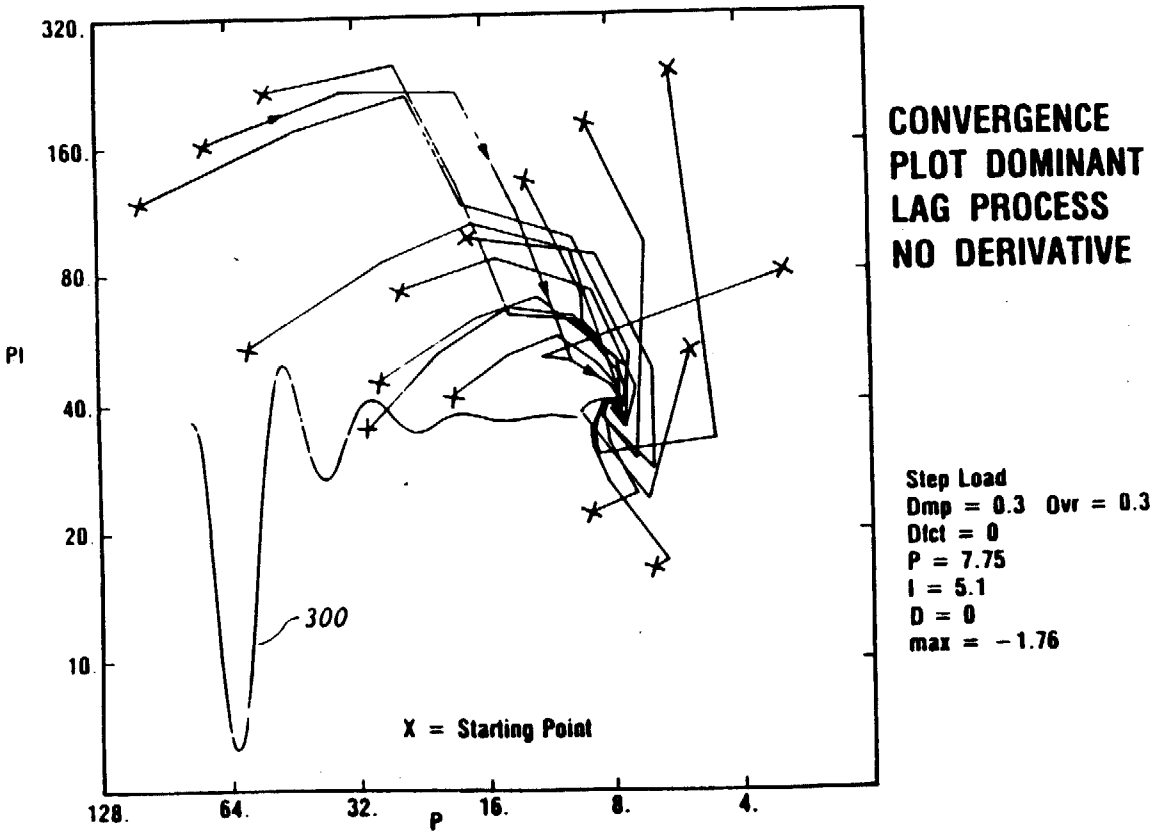
FIG. 11 is a convergence plot of test results obtained when the present invention is coupled to a dominant lag process and the D coefficient is zero.

Included in FIG. 11 are sixteen convergence plots for situations in which the process is dominated by lag and the D coefficient is set equal to zero so that the controller is a PI type. Each X of each plot represents the initial starting value for the P and I coefficients of the controller. It should be noted that each segment of a plot represents an adaptation evaluation cycle of the controller. Accordingly, the break points of each plot represents a situation where new values of coefficients have been set in the controller. As can be seen, all of the sixteen plots converge to the same final values for the P and I coefficients even though the initial values thereof were scattered in a wide range. Also presented in FIG. 11 is a trace 300 (which is shown without horizontal and vertical scales) which is the pattern of the behavior of the error signal when the controller is set with its final values for the P and I coefficients which are listed to the right of the convergence plots.

Figure 12:
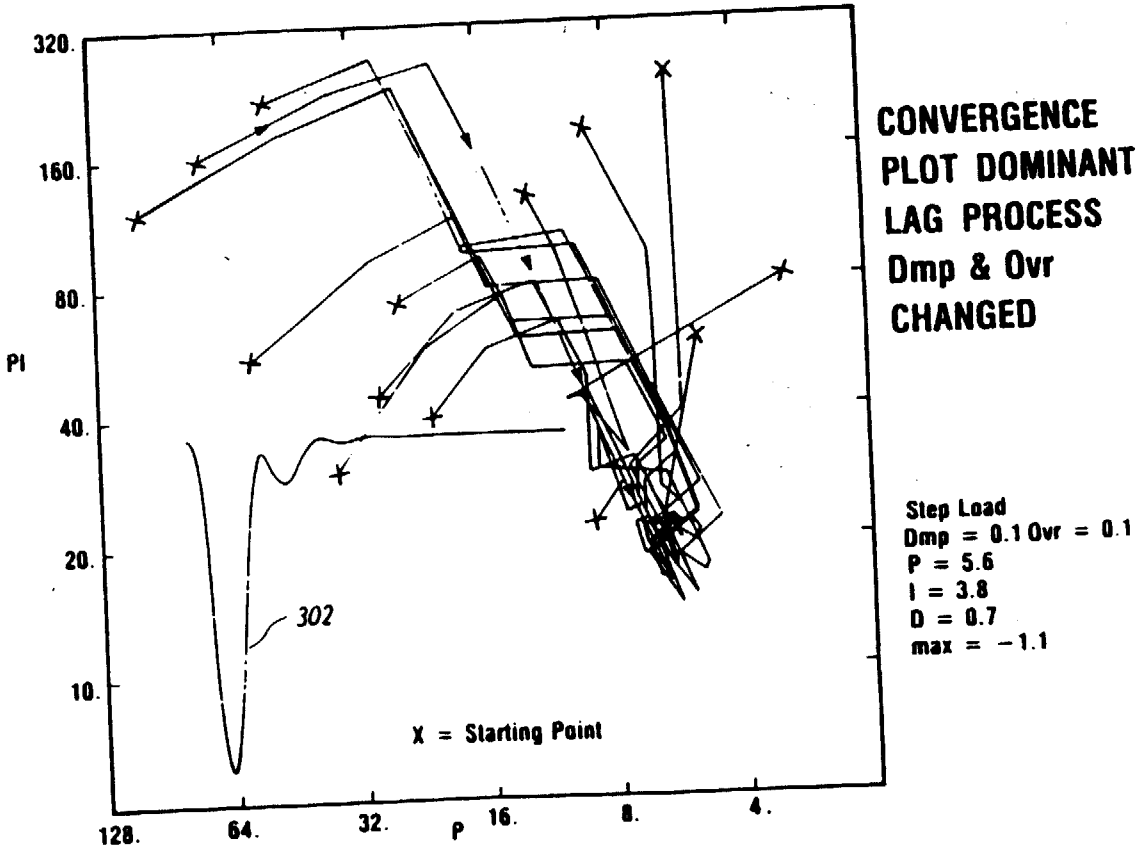
FIG. 12 is a convergence plot depicting the test results obtained when the present invention is coupled to a dominant lag process and operated with a set of conditions different from that used in FIG. 11.

In FIG. 12, the controller is a PID type and the process is lag dominated. It should be noted that the damping Dmp and the overshoot OVR constraints for this case is not the same as those used in the case depicted in FIG. 11. As can be seen, all of the sixteen plots converge to the same final values for the P and I coefficients. It should also be noted that FIG. 12 is a two-dimensional plot and the convergence of the D coefficient is not depicted. A trace 302 is the error signal pattern which results when the controller is set with the final values of the PID coefficients.

Figure 13:
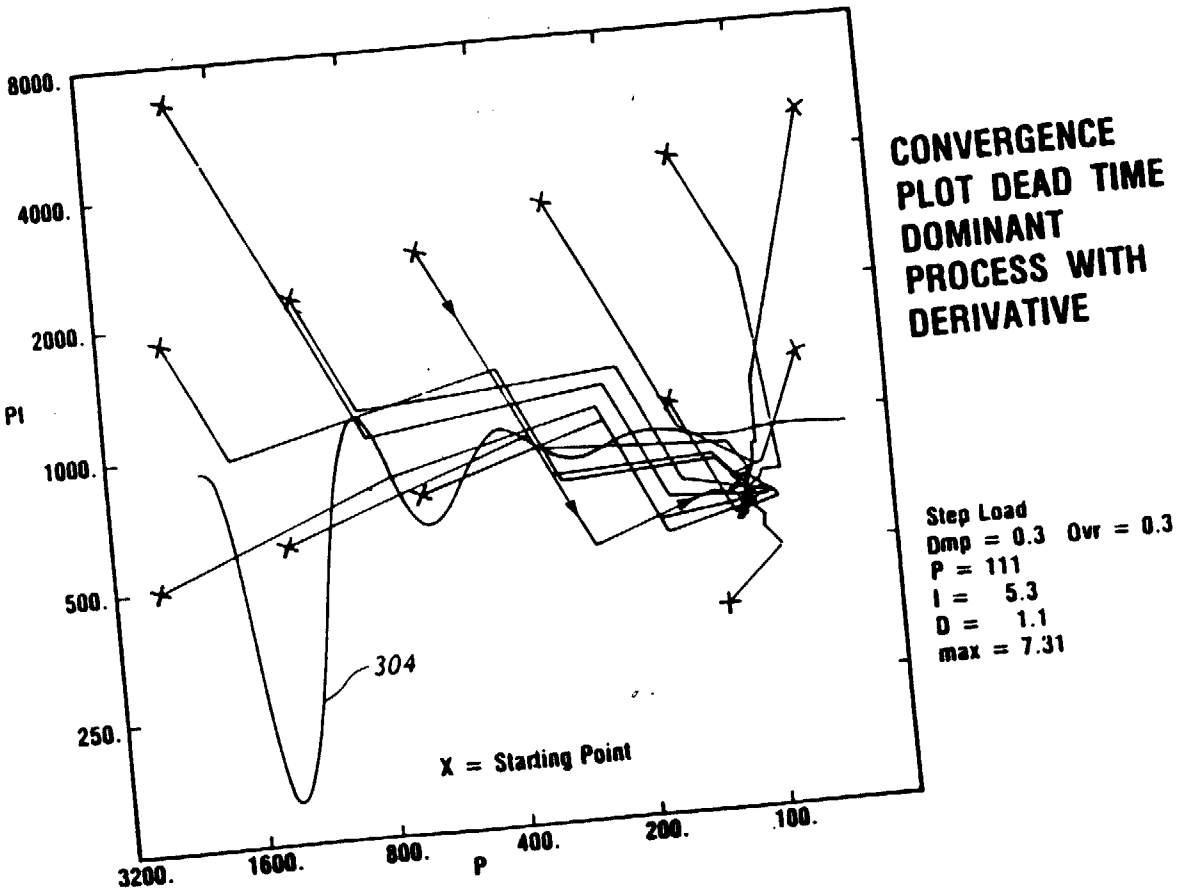
FIG. 13 is a convergence plot of the results obtained when the present invention is coupled to a process which is dominated by dead time.

With reference to FIG. 13, the controller is a PID type and the process is deadtime dominated. In this case there are fourteen plots which all converge to a final set of values for the PID coefficients. A trace 304 is the pattern of the error signal behavior when the controller is set with those final values which are shown to the right of the plots.

Figure 14:
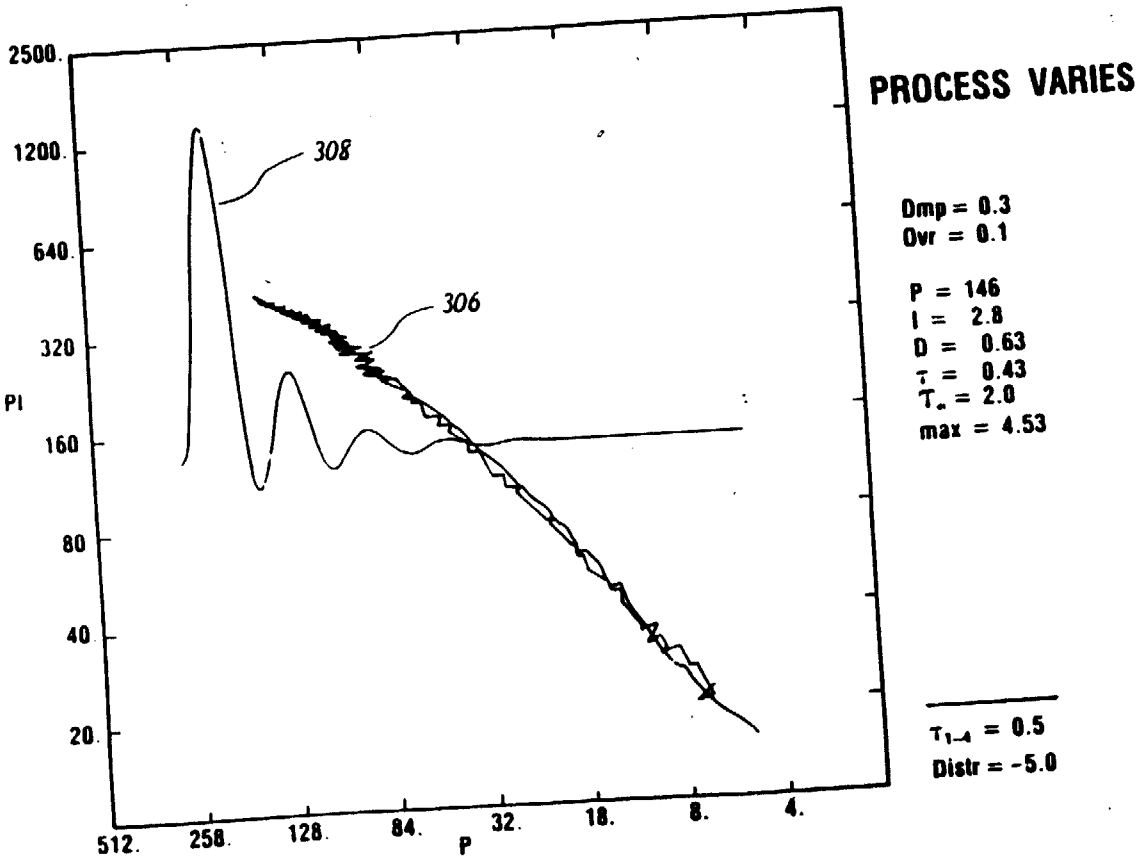
FIG. 14 is a plot showing the results obtained when the present invention is coupled to a process which is varied.

The controller used in the case depicted in FIG. 14 is a PID type. In this case, the characteristics of the process are varied and a trace 306 represents the values of the P and I coefficients (the D coefficient not shown) which were calculated and subsequently used by the controller. It should be explained that final values of the coefficients were never calculated because the process characteristics were changed before the controller could find those final values. As a test of the repeatability characteristic of the controller, the process characteristics were returned to their initial values in a manner which was the reverse of that used to increase the process characteristics. As can be seen, the return portion of the trace 306 is essentially the same as that for the leading portion. A trace 308 is the pattern of the error signal behavior when the controller is set with the initial values for the PID coefficients. These initial values are listed to the right of the plot.

While the invention has been described with reference to the preferred embodiment, it will be apparent that improvements and modifications may be made within the purview of the invention by those of ordinary skill in the art. For example, criteria other than damping or overshoot can be used to specify the ideal pattern. Moreover, the controller does not have to be the PID type since other controllers such as Smith predictors or Dahlin controllers are suitable. In addition, other commercially available computers such as the HP 9845 or the DEC VAX 11/780 can be used in place of the microprocessor 404, the RAM 406 and the EPROM 408.

What is claimed is:

[1. A pattern-recognizing self-tuning controller apparatus for use in a control system, wherein said controller apparatus includes a controller which is coupled to a process in a closed loop of said control system for controlling a process controlled variable having set point and measured values, said controller having a control action which is determined by at least one operating parameter so that the controller is responsive to a difference between said set point and measured values; said controller apparatus comprising:

first comparator means responsive to differences between said set point and measured values for generating a closed-loop behavior signal, detector means responsive to the close-loop behavior signal of said process control variable for measuring a pattern characteristic thereof and producing a measured value of said pattern characteristic second comparator means being coupled to said detector means and operating to compare said pattern characteristic measured value with a predetermined desired value for the pattern characteristic; and adjusting means coupled to said second comparator means for responding to a difference between said measured and desired values of the pattern characteristic so that the measured value substantially matches the set point value, said adjusting means not operating to alter said operating parameter of the controller when the difference between said measured and desired values is less than a prescribed difference.]

2. [The apparatus of claim 1 wherein said pattern characteristic includes] *A pattern-recognizing self-tuning controller apparatus for use in a control system, wherein said controller apparatus includes a controller which is coupled to a process in a closed loop of said control system for controlling a process controlled variable having set point and measured values, said controller having a control action which is determined by at least one operating parameter so that the controller is responsive to a difference between said set point and measured values; said controller apparatus comprising:*

*first comparator means responsive to differences between said set point and measured values for generating a closed-loop behavior signal;*

*detector means responsive to the closed-loop behavior signal of said process control variable for measuring a pattern characteristic thereof and producing a measured value of said pattern characteristic, the latter including* a first characteristic being a peak amplitude of a local extremum of said behavior signal and a second characteristic being an amplitude of said behavior signal at a point subsequent to said local extremum;

*second comparator means being coupled to said detector means and operating to compare said pattern characteristic measured value with a predetermined desired value for the pattern characteristic; and*

*adjusting means coupled to said second comparator means for responding to a difference between said measured and desired values of the pattern characteristic so that the measured value substantially matches the set point value, said adjusting means not operating to alter said operating parameter of the controller when the difference between said measured and desired values is less than a prescribed difference;* and [said controller apparatus further includes:]

means coupled to said detector means for combining said first and second characteristics to produce a measured value of said performance criterion.

3. The apparatus of claim 2 wherein said performance criterion is an overshoot ratio which is proportional to said first and second charateristics.

4. The apparatus of claim 2 wherein said detector means measures a third characteristic of said closed-loop behavior signal of the process controlled variable, said pattern characteristic includes first and second performance criterion which have corresponding first and second desired values, said combining means generates measured values of the first and second performance criterion, and said difference means further obtains the difference between the desired and measured values of said first performance criterion and of said second performance criterion respectively, and wherein said controller apparatus further includes logic means coupled to said adjusting means for selecting between said first performance criterion difference and said second performance criterion difference so that said adjusting means responds to said selection for altering said operating parameter.

5. The apparatus of claim 4 wherein said first performance criterion is an overshoot ratio which is proportional to said first and second characteristics.

6. The apparatus of claim 5 wherein said second performance criterion is a damping ratio which is proportional to said first, second and third characteristics.

7. The apparatus of claim 6 wherein said operating parameter includes a proportional (P) coefficient and an integral (I) coefficient, wherein said controller apparatus further comprises means for measuring time intervals between said first, second and third characteristics, and means responsive to said time intervals for determining a period ($T_0$) which represents the time period of the closed-loop behavior; and wherein said adjusting means changes said proportional (P) coefficient based on the selection made by said logic means and changes said integral (I) coefficient based on an adapting ratio and said measured period ($T_0$) wherein said adapting ratio has a prescribed value.

8. The apparatus of claim 7 wherein the prescribed value of said adapting ratio is variable in accordance with predetermined relationships based on the values of said period ($T_0$), of said measured damping and overshoot ratios, and of the (I) integral coefficient existing in said apparatus which produced the closed-loop behavior being evaluated.

9. The apparatus of claim 7 wherein said adapting ratio includes a second prescribed value and said operating parameter further includes a derivative (D) coefficient which has a value that is changed based on the second prescribed value of the adapting ratio and on said period ($T_0$).

10. The apparatus of claim 9 wherein the first and second prescribed values of the adapting ratios are variable in accordance with predetermined relationships based on the values of said period ($T_0$), said measured damping and overshoot ratios, and the I coefficient existing in said apparatus which produced the closed-loop behavior being evaluated.

11. The apparatus of claim 10 wherein said first and second prescribed values of the adapting ratios are Ziegler-Nichols ratios.

12. The apparatus of claim 10 wherein changes in the proportional (P) coefficient are also related to prescribed relationships based on the measured and desired values of said damping ratio and information from a prior cycle of said closed-loop behavior.

13. The apparatus of claim 12 wherein changes in said proportional (P) coefficient are also based on predetermined relationships which include first and second adapting ratios, said period ($T_0$), and the values of the integral and derivative (I and D) coefficients existing in said apparatus which produced the closed-loop behavior being evaluated.

14. The apparatus of claim 13 wherein said first, second and third characteristics are only measured if the absolute value of said first characteristic is greater than a predetermined noise level.

15. The apparatus of claim 14 further including means for measuring the time occurrence of said first characteristic and means for changing said time occurrence by an interval based on a subsequent time when the absolute value of the amplitude of said closed-loop behavior signal falls to a prescribed level.

16. The apparatus of claim 15 wherein said prescribed level is equal to 95 percent of the measured amplitude of said first characteristic.

17. The apparatus of claim 15 wherein said measured period ($T_0$) is further adjusted based on relationships which include the measured amplitudes of said first, second and third characteristics, said time intervals between said first, second and third characteristics, a fourth characteristic based on the interval between said time occurrence of the first characteristic and a time when the absolute value of said closed-loop behavior signal falls to a second prescribed level, and to the time intervals between the occurrences of previous first, second and third characteristics of a prior cycle of said closed-loop behavior signal.

18. The apparatus of claim 17 wherein said second prescribed level is equal to 60 percent of the measured amplitude of said first characteristic.

19. The apparatus of claim 17 wherein said first, second and third characteristics are three local extrema, and the absolute values of the amplitudes of the extrema are greater than associated levels that are each based on a predetermined noise level.

20. The apparatus of claim 17 wherein said first, second and third characteristics are three local extrema, and the absolute values of the amplitudes of only the first two extrema are greater than associated levels that are each based on a predetermined noise level.

21. The apparatus of claim 17 wherein said first, second and third characteristics are three local extrema, and said fourth characteristic is less than the fourth characteristic of a previously evaluated cycle of said closed-loop behavior signal.

22. The apparatus of claim 17 wherein only said first and second characteristics are respectively two local extrema of said closed-loop behavior signal and the absolute values of the amplitudes of the extrema are greater than associated levels that are each based on a predetermined noise level.

23. The apparatus of claim 17 wherein only said first characteristic is a local extrema of said closed-loop behavior signal and the fourth characteristic is less than the fourth characteristic of a previously evaluated cycle of said closed-loop behavior signal.

24. The apparatus of claim 17 wherein said second and third characteristics both occur at a time equal to a prescribed maximum time interval from the time occurrence of said first characteristic, and said fourth characteristic is greater than zero and less than the fourth characteristic of a previously evaluated cycle of said closed-loop behavior signal.

25. The apparatus of claim 17 wherein said first and second characteristics are local extrema of said closed-loop behavior signal, and said third characteristic occurs after a prescribed maximum interval from the time occurrence of said first characteristic, and said fourth characteristic is greater than zero.

26. The apparatus of claim 17 wherein a search for said second characteristic begins after a first prescribed search interval from the time occurrence of said first characteristic and a search for said third characteristic begins after a second prescribed search interval for the time occurrence of said first characteristic.

27. The apparatus of claim 26 wherein said first prescribed search interval is based on the period ($T_0$) divided by 4 and said second prescribed search interval is based on the period ($T_0$) divided by 4 and the time occurrence of said second characteristic.

28. The apparatus of claim 17 wherein a search for said second characteristic begins after the occurrence of said first characteristic and after a time when the absolute value of the amplitude of said closed-loop behavior signal has fallen to a prescribed search level.

29. The apparatus of claim 28 wherein the prescribed search level is equal to 50 percent of the amplitude of said first characteristic.

30. The apparatus of claim 17 wherein said detector means further includes means for identifying short duration peaks in said first, second and third characteristics as noise peaks, and means coupled to said noise identifying means for removing said noise peaks prior to the time occurrence of each of said first, second and third characteristics.

31. The apparatus of claim 30 further including means responsive to an open-loop behavior signal of said process controlled variable for determining an initial value for said operating parameter.

32. The apparatus of claim 31 further including means responsive to a steady state condition of said process controlled variable for measuring said noise level.

33. In a pattern-recognizing self-tuning controller device which is coupled to a process in an open loop mode for controlling a process-controlled variable having a succession of values at associated instances of time, said controller device having at least one operating parameter which affects how it responds to a change of an input thereto, wherein said process is responsive to a control signal produced by said controller device, that improvement in said controller device which comprises:

means for generating a trace signal which represents a time plot of said succession of values of the process-controlled variable, slope detecting means being responsive to the trace signal resulting when said control signal is appropriately bumped at a time T from one level to another level so that said process controlled variable correspondingly changes from one steady state condition having a first time base line to a new steady state condition having a second time base line, said slope detecting means including:

means for determining the slopes of lines extending from a point $T_f$ which is fixed on said first time base line to successive value points of said trace signal as said process controlled variable changes from said one to said new steady state conditions;

means for selecting from said lines a line having a maximum absolute value of slope;

means for identifying a value point of said trace signal through which said maximum slope line passes as an upper inflection point;

means for selecting an increment point of said trace signal, said increment point occurring prior to said upper inflection point;

means for measuring absolute value of the slope of a process indicative line which extends through said upper inflection point and said increment point;

means for measuring the intercept of said process indicative line with said first time base line;

means for measuring the time difference between said intercept and said time T and producing a first signal representative of a process dead time characteristic $T_{dt}$ of said process; and means responsive to said slope of the process indicative line for producing a second signal representative of a process sensitivity characteristic SEN; and adjusting means coupled to receive the output of said slope detecting means for responding to said first and second signals to alter said controller device operating parameter.

34. The apparatus of claim 33 wherein said increment point means further selects a second point of said trace signal, said process indicative line is chosen from first and second lines which extend respectively through said upper inflection point and said first and second points; and said detector means further includes:

means for selecting between said first and second lines the line having the maximum absolute value of slope, said maximum slope line being set as the process indicative line.

35. The device of claim 34 wherein said operating parameter includes proportional (P), integral (I) and derivative (D) coefficients and said adjusting means operates in accordance with predetermined relationships which include the following:

Proportional (P) coefficient equals 120 times $T_{dt}$ divided by SEN;

Integral (I) coefficient equals 1.5 times $T_{dt}$

Derivative (D) coefficient equals (I) Integral coefficient divided by 6; and

Period ($T_0$) equals 5 times $T_{dt}$.

36. The apparatus of claim 35 further including:

means for determining a noise level characteristic of said trace signal; and means coupled to said noise means for altering said derivative (D) coefficient based on a predetermined relationship which is proportional to said noise level characteristic.

37. The apparatus of claim 36 wherein said noise means comprises:

high-pass filtering means for removing from said trace signal prescribed high-frequency components;

integrator means coupled to receive the output of said filtering means for integrating said output over a prescribed time interval;

averaging means responsive to the output of said integrator means for generating a noise band signal having a value 2NB which is representative of the peak-to-peak noise band characteristic of said trace signal and which is based on a prescribed average value of said integrator means output.

38. The apparatus of claim 37 wherein said predetermined relationships are modified based on a quantity Z where $Z=(3.0-2NB)/2.5$ and based on the following if $0<Z<1$, derivative (D) coefficient equals Z multiplied by the quotient of integral (I) coefficient divided by six, and if $Z<0$, derivative (D) coefficient $=0$.

*39. A method for automatically adjusting the control parameters of a self-tuning controller of a process having a measured process variable signal, comprising the steps of:*

*generating an error signal equal to the difference between the process variable signal and a setpoint signal;*

*measuring a first amplitude of a first local extremum of said error signal;*

*measuring a second amplitude of a second local extremum of said error signal;*

*combining said first measured amplitude and said second measured amplitude to produce a measured performance characteristic; and*

*automatically adjusting at least one of the control parameters of the controller to minimize the difference between said measured performance characteristic and a selected value of said performance characteristic.*

*40. The method of claim 39 wherein said step of measuring a second amplitude includes measuring a second local extremum which is opposite in direction, adjacent, and later in time to said first local extremum.*

*41. The method of claim 40 wherein said step of combining includes producing an overshoot value as said measured performance characteristic.*

*42. The method of claim 40 further comprising the step of measuring a third amplitude of a third local extremum of said error signal.*

*43. The method of claim 42 wherein said step of measuring a third amplitude includes measuring a third local extremum which is opposite in direction, adjacent, and later in time to said second local extremum.*

*44. The method of claim 43 wherein said step of combining includes combining said third measured amplitude with said first and second measured amplitudes to produce said measured performance characteristic.*

*45. The method of claim 44 wherein said step of combining includes producing a damping value as said measured performance characteristic.*

*46. The method of claim 44 wherein said step of combining includes producing two measured performance characteristics.*

*47. The method of claim 46 wherein said step of combining includes producing a damping value as one of said measured performance characteristics and producing an overshoot value as the other of said measured performance characteristics.*

*48. A method for automatically adjusting the control parameters of a self-tuning controller of a process having a measured process variable signal, comprising the steps of:*

*generating an error signal equal to the difference between the process variable signal and a setpoint signal;*

*measuring a first amplitude of a first local extremum of said error signal;*

*measuring a second amplitude of a second local extremum of said error signal;*

*combining said first measured amplitude and said second measured amplitude to produce a measured performance characteristic;*

*comparing said measured performance characteristic to a selected value of said performance characteristic to generate a performance characteristic difference; and*

*automatically adjusting at least one of the control parameters of the controller to minimize said performance characteristic difference.*

*49. The method of claim 48 wherein said step of measuring a second amplitude includes measuring a second local extremum which is opposite in direction, adjacent, and later in time to said first local extremum.*

*50. The method of claim 49 wherein said step of combining includes producing an overshoot value as said measured performance characteristic.*

*51. The method of claim 49 further comprising the step of measuring a third amplitude of a third local extremum of said error signal.*

*52. The method of claim 49 wherein said step of measuring a third amplitude includes measuring a third local extremum which is opposite in direction, adjacent, and later in time to said second local extremum.*

*53. The method of claim 52 wherein said step of combining includes combining said third measured amplitude with said first and second measured amplitudes to produce said measured performance characteristic.*

*54. The method of claim 53 wherein said step of combining includes producing a damping value as said measured performance characteristic.*

*55. The method of claim 53 wherein said step of combining includes producing two measured performance characteristics.*

*56. The method of claim 55 wherein said step of combining includes producing a damping value as one of said measured performance characteristics and producing an overshoot value as the other of said measured performance characteristics.*

*57. A method for automatically adjusting the control parameters of a self-tuning controller of a process having a measured process variable signal, comprising the steps of:*

*generating an error signal equal to the difference between the process variable signal and a setpoint signal;*

*measuring amplitude values of at least two local extrema of said error signal;*

*utilizing said amplitude values to produce a measured damping characteristic of said error signal; and*

*automatically adjusting at least one of the control parameters of the controller to minimize the difference between said measured damping characteristic and a selected value of said damping characteristic.*

*58. The method of claim 57 wherein one of said control parameters is a proportional coefficient and wherein said step of automatically adjusting includes adjusting said proportional coefficient.*

*59. A method for automatically adjusting the control parameters of a self-tuning controller of a process having a measured process variable signal, comprising the steps of:*

*generating an error signal equal to the difference between the process variable signal and a setpoint signal;*

*measuring amplitude values of at least two local extrema of said error signal;*

*utilizing said amplitude values to produce a measured damping characteristic of said error signal;*

*comparing said measured damping characteristic to a selected value of said damping characteristic to generate a damping characteristic difference; and*

*automatically adjusting one of the control parameters of the controller to minimize said damping characteristic difference.*

*60. The method of claim 59 wherein one of said control parameters is a proportional coefficient and wherein said step of automatically adjusting includes adjusting said proportional coefficient.*

*61. A method for automatically adjusting the control parameters of a self-tuning controller of a process having a measured process variable signal, comprising the steps of:*

*generating an error signal equal to the difference between the process variable signal and a setpoint signal;*

*measuring amplitude values of at least two local extrema of said error signal;*

*measuring the times of occurrence of said amplitude values;*

*computing a period from said times of occurrence;*

*utilizing said amplitude values to produce a measured damping characteristic and a measured overshoot characteristic of said error signal; and*

*automatically adjusting at least one of the control parameters of the control to minimize the difference between a measured ratio of said parameter to said period and a selected value of said ratio in response to said measured overshoot characteristic and said measured damping characteristic.*

*62. The method of claim 61 wherein said control parameters include an integral and a derivative coefficient and wherein said step of automatically adjusting includes adjusting said integral and said derivative coefficients in response to the difference between said measured damping characteristic and said measured overshoot characteristic.*

*63. An apparatus for automatically adjusting the control parameters of a self-tuning controller of a process having a measured process variable signal, comprising:*

*means for generating an error signal equal to the difference between the process variable signal and a setpoint signal;*

*means for measuring a first amplitude of a first local extremum of said error signal;*

*means for measuring a second amplitude of a second local extremum of said error signal;*

*means for combining said first measured amplitude and said second measured amplitude to produce a measured performance characteristic; and*

*means for automatically adjusting at least one of the control parameters of the controller to minimize the difference between said measured performance characteristic and a selected value of said performance characteristic.*

*64. An apparatus for automatically adjusting the control parameters of a self-tuning controller of a process having a measured process variable signal, comprising:*

*means for generating an error signal equal to the difference between the process variable signal and a setpoint signal;*

*means for measuring a first amplitude of a first local extremum of said error signal;*

*means for measuring a second amplitude of a second local extremum of said error signal;*

*means for combining said first measured amplitude and said second measured amplitude to produce a measured performance characteristic;*

*means for comparing said measured performance characteristic to a selected value of said performance characteristic to generate a performance characteristic difference; and*

*means for adjusting at least one of the control parameters of the controller to minimize said performance characteristic difference.*

*65. An apparatus for automatically adjusting the control parameters of a self-tuning controller of a process having a measured process variable signal, comprising:*

*means for generating an error signal equal to the difference between the process variable signal and a setpoint signal;*

*means for measuring amplitude values of at least two local extrema of said error signal;*

*means for utilizing said amplitude values to produce a measured damping characteristic of said error signal; and*

*means for automatically adjusting at least one of the control parameters of the controller to minimize the difference between said measured damping characteristic and a selected value of said damping characteristic.*

*66. An apparatus for automatically adjusting the control parameters of a self-tuning controller of a process having a measured process variable signal, comprising:*

*means for generating an error signal equal to the difference between the process variable signal and a setpoint signal;*

*means for measuring amplitude values of at least two local extrema of said error signal;*

*means for utilizing said amplitude values to produce a measured damping characteristic of said error signal;*

*means for comparing said measured damping characteristic to a selected value of said damping characteristic to generate a damping characteristic difference; and*

*means for automatically adjusting at least one of the control parameters of the controller to minimize said damping characteristic difference.*

*67. An apparatus for automatically adjusting the control parameters of a self-tuning controller of a process having a measured process variable signal, comprising:*

*means for generating an error signal equal to the difference between the process variable signal and a setpoint signal;*

*means for measuring amplitude values of at least two local extrema of said error signal;*

*means for measuring the times of occurrence of said amplitude values;*

*means for computing a period from said times of occurrence;*

*means for utilizing said amplitude values to produce a measured damping characteristic and a measured overshoot characteristic of said error signal; and*

*means for automatically adjusting at least one of the control parameters of the controller to minimize the difference between said measured period and a selected value of said measured period in response to said measured overshoot characteristic and said measured damping characteristic.*

* * * * *